United States Patent
Sugihara

(10) Patent No.: US 12,443,812 B2
(45) Date of Patent: Oct. 14, 2025

(54) COLOR DISPLAY, AUTHENTICATION MEDIUM, AND METHOD FOR DETERMINING AUTHENTICITY OF COLOR DISPLAY

(71) Applicant: TOPPAN INC., Tokyo (JP)

(72) Inventor: Keitaro Sugihara, Tokyo (JP)

(73) Assignee: TOPPAN INC., Tokyo (JP)

( * ) Notice: Subject to any disclaimer, the term of this patent is extended or adjusted under 35 U.S.C. 154(b) by 487 days.

(21) Appl. No.: 17/961,788

(22) Filed: Oct. 7, 2022

(65) Prior Publication Data

US 2023/0031501 A1 Feb. 2, 2023

Related U.S. Application Data

(63) Continuation of application No. PCT/JP2021/015016, filed on Apr. 9, 2021.

(30) Foreign Application Priority Data

Apr. 10, 2020 (JP) .................... 2020-070966

(51) Int. Cl.
*G06K 7/14* (2006.01)
*B42D 25/30* (2014.01)
(Continued)

(52) U.S. Cl.
CPC .......... *G06K 7/1417* (2013.01); *B42D 25/30* (2014.10); *B42D 25/328* (2014.10); *G06K 7/1413* (2013.01); *G02B 27/4205* (2013.01)

(58) Field of Classification Search
CPC .... G06K 7/1417; G06K 7/1413; B42D 25/30; B42D 25/328; B42D 25/324;
(Continued)

(56) References Cited

U.S. PATENT DOCUMENTS

2008/0253258 A1 10/2008 Toda et al.
2011/0310485 A1 12/2011 Vizdal et al.
(Continued)

FOREIGN PATENT DOCUMENTS

JP H04-136810 A 5/1992
JP 2003-215319 A 7/2003
(Continued)

OTHER PUBLICATIONS

International Searching Authority, "International Search Report," issued in connection with International Patent Application No. PCT/JP2021/015016, dated Jun. 22, 2021.
(Continued)

*Primary Examiner* — Mariam Qureshi
(74) *Attorney, Agent, or Firm* — Foley & Lardner LLP

(57) ABSTRACT

A color display of an embodiment includes: an embossed layer; a high refractive index layer; and a protective layer, laminated in this order, wherein the high refractive index layer has a highest refractive index among these layers, the embossed layer includes a first region having a periodic structure with a period at least smaller than a center wavelength of visible light, a plurality of the first regions, each having a strip shape, are connected to each other at their longitudinal end sides, the first regions being offset from each other in a direction perpendicular to a longitudinal direction of the strip shape, as viewed via a display surface, and a periodic direction of the periodic structure is parallel to the longitudinal direction.

13 Claims, 14 Drawing Sheets

(51) Int. Cl.
*B42D 25/328* (2014.01)
*G02B 27/42* (2006.01)

(58) Field of Classification Search
CPC .............. G02B 27/4205; G02B 5/1809; G02B 5/1852; G02B 5/1861
See application file for complete search history.

(56) References Cited

U.S. PATENT DOCUMENTS

| | | | |
|---|---|---|---|
| 2012/0162771 A1* | 6/2012 | Walter | G02B 5/1847 |
| | | | 359/569 |
| 2014/0293424 A1 | 10/2014 | Toda et al. | |
| 2015/0219807 A1 | 8/2015 | Lochbihler | |
| 2015/0258835 A1 | 9/2015 | Fischer et al. | |
| 2020/0408972 A1 | 12/2020 | Tashiro et al. | |
| 2021/0001659 A1 | 1/2021 | Yamamoto et al. | |

FOREIGN PATENT DOCUMENTS

| | | |
|---|---|---|
| JP | 2007-298777 A1 | 11/2007 |
| JP | 2011-170178 A | 9/2011 |
| JP | 2016-114770 A1 | 6/2016 |
| JP | 2018-063305 A | 4/2018 |
| JP | 2019-164333 A1 | 9/2019 |
| WO | WO-98/23979 A1 | 6/1998 |
| WO | WO-2018/070431 A1 | 4/2018 |
| WO | WO-2018/114034 A1 | 6/2018 |
| WO | WO-2019/182051 A1 | 9/2019 |

OTHER PUBLICATIONS

International Searching Authority, "Written Opinion," issued in connection with International Patent Application No. PCT/JP2021/015016, dated Jun. 22, 2021.

European Extended Search Report issued in corresponding European Patent Application No. 21785251.6 dated Nov. 8, 2023 (13 pages).

* cited by examiner

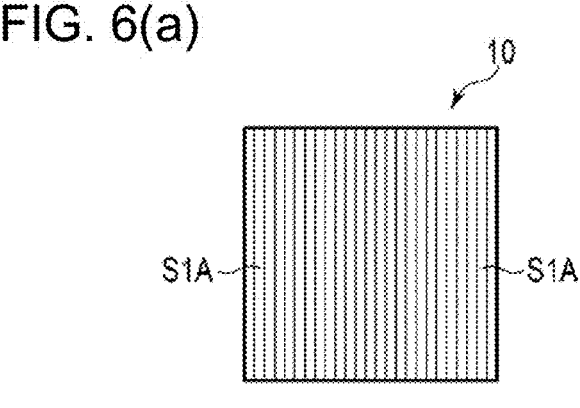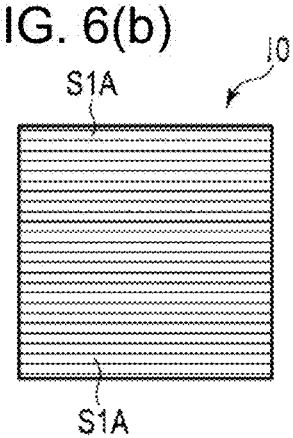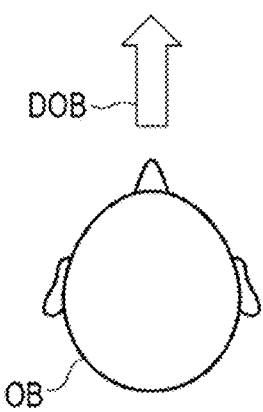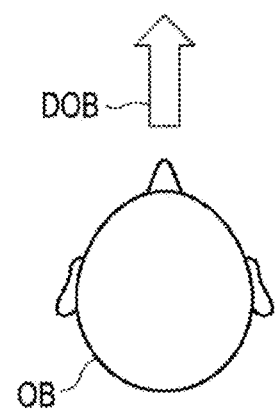
FIG. 6(a)    FIG. 6(b)
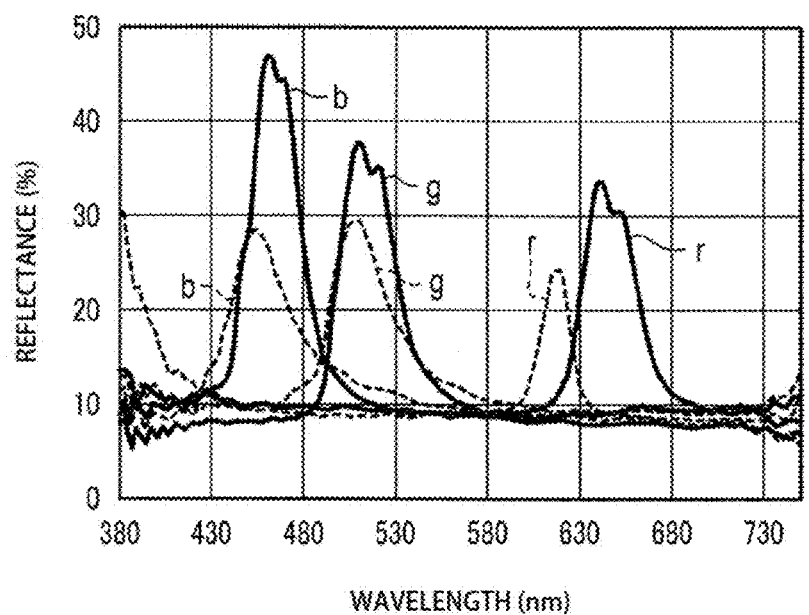
FIG.7

COLOR DISPLAY, AUTHENTICATION MEDIUM, AND METHOD FOR DETERMINING AUTHENTICITY OF COLOR DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/015016, filed on Apr. 9, 2021, which in turn claims the benefit of JP 2020-070966, filed Apr. 10, 2020 the disclosures of all which are incorporated herein by reference in its entirety.

TECHNICAL FIELD

Embodiments of the present invention relate to a color display, an authentication medium, and a method for determining authenticity of a color display.

BACKGROUND

Optical devices using guided-mode resonance have been proposed. Such optical devices have a sub-wavelength grating, which is a diffraction grating with a period smaller than the wavelength of visible light. When light is incident on the sub-wavelength grating, reflection of light due to guided-mode resonance occurs while suppressing reflection of diffracted light into a space on the incident light side. Guided-mode resonance is a phenomenon in which light in a specific wavelength band propagates through multiple reflections in an optical device, causing resonance so that light in the specific wavelength band is reflected by the optical device as reflected light with high intensity. Such optical devices are used as color displays that impart at least one of counterfeit resistance and high designability to an object (see, e.g., JP 2018-063305 A).

Further, a technique called changing is also used. In this technique, a diffraction direction is controlled by the arrangement of diffraction gratings to determine a pixel region that causes a diffraction phenomenon according to the observation angle, so that an image changes depending on the observation angle (see, e.g., JP H4-136810 A).

By using this technique, there have been used color displays in which pixels are arranged in a matrix to form a grating structure having a plurality of pixels that cause diffraction at a specific incidence angle, so that an image continuously changes depending on the observation angle (see, e.g., JP 2011-170178 A).

SUMMARY OF THE INVENTION

The color displays are required to reflect light having specific wavelengths or emit a plurality of types of light having different wavelengths depending on the application of the color display, the environment to which the color display is applied, and the expected function of the color display. These demands are increasing in recent years as the applications, environments and functions described above become more diverse.

By providing arbitrary structures in a plurality of pixels, it is possible to apply color displays having high designability with rich color expression emitting a plurality of types of light. However, since a different structure is assigned to each pixel, the reflectance is reduced, which reduces the visibility of the color display.

Further, in order to increase the reflectance per unit pixel, it is necessary to increase the pixel size. However, the larger the pixel size, the lower the resolution and the less visible the color display. For this reason, it is difficult to provide color displays having high resolution and rich color expression. Therefore, there is a demand for color displays having high resolution and rich color expression.

The present disclosure aims to provide a color display that enhances the intensity of reflected light by guided-mode resonance, increases the resolution by diversifying the wavelength, and achieves rich color expression, and provide an authentication medium using the same and a method for determining authenticity of the color display.

A color display for solving the above problem includes: an embossed layer; a high refractive index layer; and a protective layer, laminated in this order, wherein the high refractive index layer has a highest refractive index among these layers, the embossed layer includes a first region (A) having a periodic structure with a period at least smaller than a center wavelength of visible light, a plurality of the first regions (A), each having a strip shape, are connected to each other at their longitudinal end sides, the first regions (A) being offset from each other in a direction perpendicular to a longitudinal direction of the strip shape, as viewed via a display surface, and a periodic direction of the periodic structure is parallel to the longitudinal direction.

An authentication medium for solving the above problem includes: the above color display; and a support that supports the color display.

In the color display composed of the embossed layer, the high refractive index layer, and the protective layer, the high refractive index layer that follows a surface of the embossed layer serves as a waveguide layer and induces guided-mode resonance.

Since the light propagating by guided-mode resonance is diffracted light produced by a periodic structure, the reflected light generated by guided-mode resonance increases or decreases depending on the arrangement direction of the periodic structures disposed in the regions having a long axis and short axis.

Therefore, according to the above configuration, a guided-mode resonance effect can be controlled using the regions having the long axis and the short axis.

In the above color display, zeroth-order diffracted light is emitted from the first region (A) due to resonance occurring by a periodic configuration of the high refractive index layer laminated on the periodic structure.

According to the above configuration, light propagates through the high refractive index layer as a waveguide layer, and locally permeates into the embossed layer or the protective layer through which light is incident, and the permeated light and incident light interfere with light reflected from a surface of the embossed layer or the protective layer to produce light with enhanced intensity, which can be emitted as zeroth-order diffracted light.

In the above color display, the periodic structure included in the first region (A) includes a plurality of periods selectively used, and a longitudinal dimension of the first region (A) is an integer multiple of a value obtained by using a least common multiple of the plurality of periods selectively used as a dividend and a greatest common divisor of the plurality of periods selectively used as a divisor.

According to the above configuration, when a plurality of periodic structures are arranged in the first region (A), the periods can be prevented from being locally disturbed due to the relationship between the dimension in the longitudinal direction of the first region (A) and the period, and zeroth-order diffracted light can be emitted without loss.

In the above color display, the embossed layer includes the first region (A) having a strip shape configured with a first periodic structure and a second region (B) configured with a second periodic structure including a plurality of different periods, a plurality of the first regions (A) and a plurality of the second regions (B) being alternately arranged at least in the longitudinal direction or the direction perpendicular to the longitudinal direction, and the second region (B) has a dimension smaller than that of the first region (A).

According to the above configuration, since an optical effect achieved in the first region (A) and an optical effect achieved in the second region (B) are different from each other, a color display having high designability can be provided.

In the above color display, first-order diffracted light is emitted from the second region (B) due to interference occurring by a mixed periodic configuration of the high refractive index layer laminated on the second periodic structure.

According to the above configuration, the first region (A) at which zeroth-order diffracted light is emitted can be seen at a reflection angle depending on the incidence angle. On the other hand, since the second region (B) at which first-order diffracted light is emitted can control the reflection angle, the second region (B) can emit first-order diffracted light at an angle which is the same or different from that of zeroth-order diffracted light, providing a color display having high designability.

In the above color display, an angle formed between the display surface and a plane in which a viewing direction of an observer observing the color display is included is an observation angle. The observation angle at which the zeroth-order diffracted light emitted from the first region (A) is observed and the observation angle at which the first-order diffracted light emitted from the second region (B) is observed are different from each other.

According to the above configuration, since the angle at which the first region (A) can be observed and the angle at which the second region (B) can be observed are different from each other, a highly visible color display can be provided.

In the above color display, a color image is formed at the observation angle at which the zeroth-order diffracted light emitted from the first region (A) is observed, and a grayscale image is formed at the observation angle at which the first-order diffracted light emitted from the second region (B) is observed.

According to the above configuration, since a color image and a grayscale image can be observed at different angles, changes in the image and appearance or disappearance of colors can be recognized. This provides high designability and can be used as a criterion for determining authenticity.

In the above color display, an image formed of at least one of the first region (A) and the second region (B) can be used as a machine-readable authentication code for determining authenticity.

According to the above configuration, an image formed of the first region (A) or the second region (B), or color elements or grayscale elements as image elements can be stored as an authentication code, which can be applied to authenticity determination.

In the above color display, the first periodic structure includes convexities and concavities, the convexities and concavities have a height difference between adjacent pairs of the convexities and concavities, the first region (A) includes a first sub-region (A1) in which at least one of the height difference, a dimension ratio between the convexities and the concavities, and a period is locally different, and an authentication code formed of the first sub-region (A1) can be used as a machine-readable authentication code for determining authenticity.

According to the above configuration, the wavelength and the intensity of the reflected light generated by guided-mode resonance can be changed depending on the height difference between adjacent pairs of the convexities and the concavities, the dimension ratio between the convexities and the concavities, and the period. Accordingly, the first region (A) and the first sub-region (A1) can have different color information, and the first sub-region (A1) can be stored as an authentication code used for determining authenticity.

In the above color display, a position of a viewpoint for observing the color image formed of the first region (A) is an observation position. The color display has a first position and a second position relative to a rotation axis normal to a plane in which the color display extends. The second position is a position shifted from the first position by rotating the color display by 90° about the rotation axis. The color display, when oriented in the first position, displays a first color image (1) having a first color to the observation position. Further, the color display, when oriented in the second position, displays a second color image (2) having a second color to the observation position. The first region (A) includes a second sub-region (A2) which locally includes a plurality of periods. The second sub-region (A2) is formed as an authentication code having a same color in both the first position and the second position. The authentication code is used as a machine-readable According to the above configuration, the color information of the reflected light emitted by guided-mode resonance differs depending on whether the color display is oriented in the first position or the second position when it is observed. Therefore, by controlling the color information obtained at the first position and the second position, both positions can provide the same color information as in the second sub-region (A2). Accordingly, by storing the second sub-region (A2) as an authentication code, the color display can be applied to authenticity determination.

In the above color display, the second region (B), which includes a plurality of periods in the second periodic structure, includes a third sub-region (B1) locally configured with a single period. An authentication code formed of the third sub-region (B1) can be used as a machine-readable authentication code for determining authenticity.

According to the above configuration, it is possible to provide color information to the third sub-region (B1) while the grayscale information is reflected by the second region (B). Therefore, by storing the third sub-region (B1) as an authentication code, the third sub-region (B1) can be used for authenticity determination.

In the above color display, the second region (B) includes a fourth sub-region (B2) having a relationship of a plurality of periods locally different from that of the second periodic structure. Accordingly, an authentication code formed of the fourth sub-region (B2) can be used as a machine-readable authentication code for determining authenticity.

According to the above configuration, an emission angle can be controlled by the period information included in the second region (B). Therefore, by storing the fourth sub-region (B2) having an emission angle different from that of the second region (B) as an authentication code, the fourth sub-region (B2) can be used for authenticity determination.

In the above color display, the second region (B) includes a fifth sub-region (B3) having an arrangement direction of convexities and concavities locally different from that of the second periodic structure. Accordingly, an authentication code formed of the fifth sub-region (B3) can be used as a machine-readable authentication code for determining authenticity.

According to the above configuration, it is possible to provide grayscale gradation information to the fifth sub-region (B3) while the grayscale information is reflected by the second region (B). Accordingly, an authentication code formed of the fifth sub-region (B3) can be used for authenticity determination.

In the above color display, an authentication code formed of a third region (C) different from each of the first region (A) and the second region (B) can be used as a machine-readable authentication code for determining authenticity.

According to the above configuration, by providing a new third region (C), information different from each of the first region (A) and the second region (B) can be provided. Accordingly, an authentication code formed of the third region (C) can be used for authenticity determination.

The present disclosure can provide a color display that enhances the intensity of reflected light by guided-mode resonance, increases the resolution by diversifying the wavelength, and achieves rich color expression, and provide an authentication medium using the same and a method for determining authenticity of the color display.

BRIEF DESCRIPTION OF THE DRAWINGS

FIGS. 6(a)-6(b) are schematic diagrams illustrating the relationship between an orientation angle of a concavo-convex surface and a viewing direction of an observer.

FIG. 7 is a graph showing a relationship between an orientation angle of a concavo-convex surface and a spectrum of reflectance for each wavelength.

DETAILED DESCRIPTION

Figure 1:
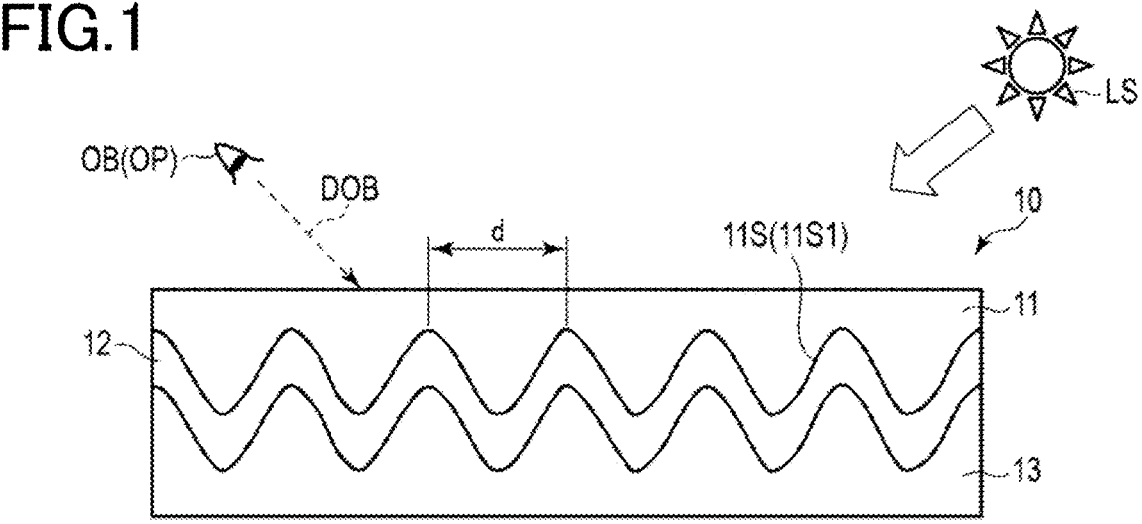
FIG. 1 is a cross-sectional view schematically illustrating a structure of a color display according to a first embodiment together with an observer and a light source.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

First Embodiment

With reference to the drawings, a first embodiment of a color display, an authentication medium, and a method for determining authenticity of the color display will be described. In the following description, a structure of a color display, a shape of a concavo-convex surface, an orientation angle of the concavo-convex surface, an effect of the color display, and a method for producing the color display will be described in sequence.

(Structure of Color Display)

With reference to FIGS. 1 to 9, a structure of a color display of the first embodiment will be described.

FIG. 1 is a cross-sectional view schematically illustrating a structure of a color display according to the first embodiment together with an observer and a light source.

As shown in FIG. 1, a color display 10 includes an embossed layer 11, a high refractive index layer 12, and a protective layer 13. The embossed layer 11, the high refractive index layer 12, and the protective layer 13 are laminated in this order in the color display 10. The layers 11, 12 and 13 are light transmissive.

The embossed layer 11, the protective layer 13 and the high refractive index layer 12 have a refractive index n1, a refractive index n3 and a refractive index n2, respectively. The refractive index n2 is higher than each of the refractive index n1 and the refractive index n3. The refractive index n1 may be a value which is the same as the refractive index n3 or different from the refractive index n3.

The embossed layer 11 includes a concavo-convex surface 11S1 on at least part of a surface 11S that is in contact with the high refractive index layer 12. In the example shown in FIG. 1, the entire surface 11S is the concavo-convex surface 11S1. The concavo-convex surface 11S1 has a period d, which can be equal to or less than the center wavelength of visible light. The period d of the concavo-convex surface 11S1 can be equal to or more than half the lower limit of the wavelength of visible light. Specifically, the period d of the concavo-convex surface 11S1 is within the range of 250 nm or more and 500 nm or less. Each period includes one concavity and one convexity in a direction in which concavities and convexities of the concavo-convex surface 11S1 are arranged, that is, in a horizontal direction of the drawing in the example shown in FIG. 1. In each period, one concavity and one convexity are arranged alternately. The concavo-convex surface 11S1 has a wave shape in a cross-section perpendicular to a plane in which the color display 10 extends. The wave shape of the concavo-convex surface 11S1 is continuous in a depth direction of the drawing.

The high refractive index layer 12 has a thickness capable of following the surface 11S of the embossed layer 11. The high refractive index layer 12 can have a thickness of several nm or more and one hundred and several tens of nm or less. The high refractive index layer 12 has a wave shape following the concavo-convex surface 11S1 in a cross-section perpendicular to a plane in which the color display 10 extends. The wave shape of the high refractive index layer 12 is continuous in the depth direction of the drawing.

Light is incident on the color display 10 from a light source LS located on a side of the embossed layer 11 opposite to that facing the high refractive index layer 12. The light source LS may be, for example, the sun or a lighting device. The color display 10 is observed by an observer OB from a side of the embossed layer 11 opposite to that facing the high refractive index layer 12. An observation position OP, which is a position of the viewpoint of the observer OB, may be any position in the space on a side of the embossed layer 11 opposite to that facing the high refractive index layer 12. A direction in which the observer OB observes the color display 10 from the observation position OP is a viewing direction DOB of the observer OB.

In the present embodiment, an angle formed between the plane in which the viewing direction DOB is included and the plane in which the color display 10 extends is defined as an observation angle. A surface of the embossed layer 11 facing away from the surface 11S has high flatness sufficient to be regarded as a flat surface. Further, a surface having a roughness sufficiently small relative to the wavelength, typically 1/10 or less, can be regarded as a flat surface. Therefore, the observation angle can be defined as an angle formed between the plane in which the viewing direction DOB is included and the surface of the embossed layer 11 facing away from the surface 11S.

Next, with reference to FIGS. 2 to 5, guided-mode resonance occurring in the color display 10 will be described.

Figure 2:
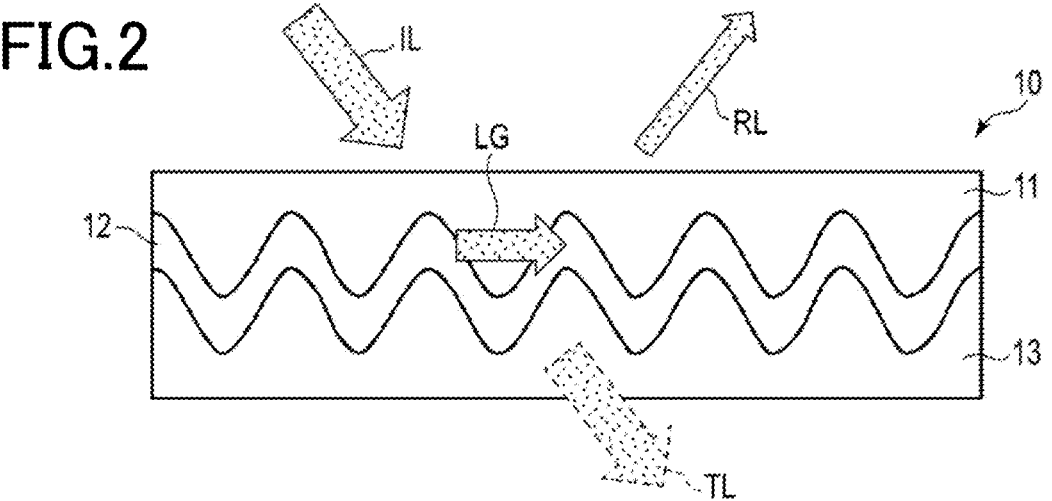
FIG. 2 is a schematic diagram illustrating a behavior of light in the color display shown in FIG. 1.

FIG. 2 is a schematic diagram illustrating a behavior of light in the color display shown in FIG. 1.

As shown in FIG. 2, guided-mode resonance occurs in the color display 10 having at least three layers as described above. Essential conditions for causing guided-mode resonance are that a layer having the highest refractive index is located as the central one of these three layers, and that the layer located at the center is sandwiched between two layers each having a refractive index different from that of the layer located at the center. That is, in the color display 10, it is required that the high refractive index layer 12 is sandwiched between the embossed layer 11 and the protective layer 13.

In the color display 10, the high refractive index layer 12 is included in a waveguide layer. Of the incident light IL incident on the color display 10, part of the light diffracted by the high refractive index layer 12 propagates through the high refractive index layer 12 while being totally reflected at the interface between the embossed layer 11 and the high refractive index layer 12 and the interface between the high refractive index layer 12 and the protective layer 13. Such propagation of light occurs due to the refractive index n2 of the high refractive index layer 12 being higher than the refractive index n1 of the embossed layer 11 and higher than the refractive index n3 of the protective layer 13. Further, of the incident light IL, only the light with wavelengths satisfying the waveguide propagation conditions, described later, propagates as propagating light LG through the high refractive index layer 12. As a result of the propagation, light having high luminance is reflected by the color display 10 as reflected light RL. The reflected light RL is reflected in the direction of specular reflection. On the other hand, light with wavelengths that do not satisfy the waveguide propagation conditions is transmitted through the color display 10 and exits the color display 10 as transmitted light TL.

Figure 3:
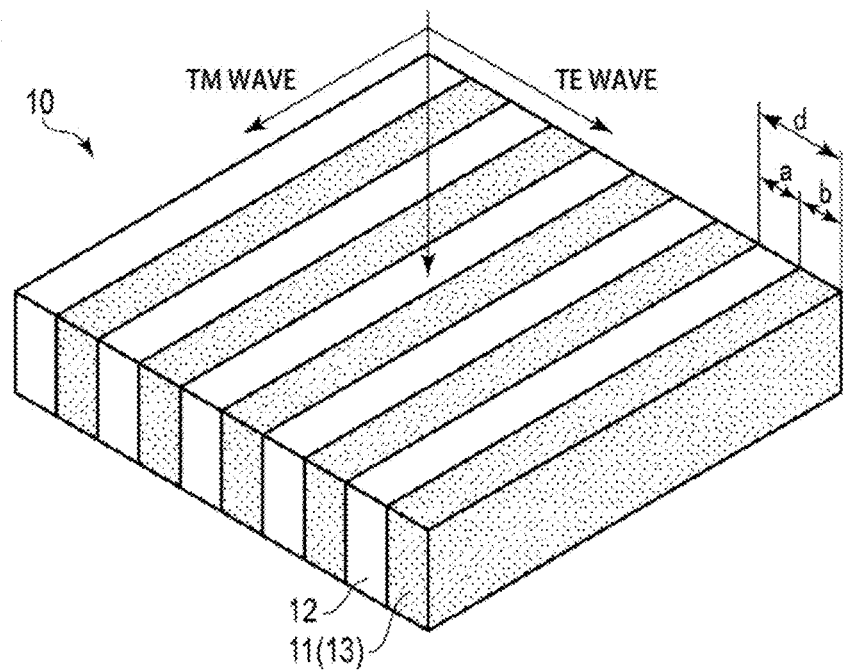
FIG. 3 is a schematic diagram of a color display for explaining guided-mode resonance.

FIG. 3 is a schematic diagram of a color display for explaining guided-mode resonance.

In FIG. 3, the color display 10 is schematically illustrated for explaining the waveguide propagation conditions. When viewed in the propagation direction of light in the color display 10, in the arrangement direction of the concavities and convexities of the high refractive index layer 12, portions of the high refractive index layer 12 alternate with portions of the embossed layer 11 or portions of the protective layer 13. That is, in the arrangement direction of the concavities and convexities, high refractive index portions and low refractive index portions are alternately arranged.

The propagation conditions can be represented by the following formulae (1) to (6) using an occupancy ratio F of the high refractive index layer 12 to the period d of the concavo-convex surface, a wavelength $\lambda$ of the incident light IL, the period d of the concavo-convex surface, a wavenumber k, and a reciprocal lattice vector K.

[Math. 1]

$$n_{eff\_TE} = \sqrt{Fn_2^2 + (2-F)n_{1 \text{ or } 3}^2} \quad \text{Formula (1)}$$

[Math. 2]

$$n_{eff\_TM} = \frac{1}{\sqrt{\frac{F}{n_2^2} + \frac{(1-F)}{n_{1 \text{ or } 3}^2}}} \quad \text{Formula (2)}$$

[Math. 3]

$$kn_{1 \text{ or } 3}\sin\theta + mK = \beta \quad \text{Formula (3)}$$

In the above formulae, $$k = 2\pi/\lambda \quad \text{Formula (4)}$$

$$K = 2\pi/d \quad \text{Formula (5)}$$

$$\beta = (2\pi/\lambda) \cdot n_{eff} \quad \text{Formula (6)}$$

In the formula (3), an incidence angle $\theta$ of the incident light IL and a diffraction order m are integers. Further, in the formula (3), a propagation constant $\beta$ of the waveguide layer, that is, the high refractive index layer 12, depends on the wavelength $\lambda$ of the incident light IL and an effective refractive index $n_{eff}$ of the high refractive index layer 12. The formula (1) represents an effective refractive index $n_{eff}$ of the high refractive index layer 12 to a TE wave, and the formula (2) represents an effective refractive index $n_{eff}$ of the high refractive index layer 12 to a TM wave. The effective refractive index $n_{eff}$ of the high refractive index layer 12 to the TE wave differs from the effective refractive index $n_{eff}$ to the TM wave when the period d of the concavo-convex surface is shorter than the wavelength $\lambda$ of the incident light IL. Each effective refractive index $n_{eff}$ is determined by the occupancy ratio of the high refractive index layer 12 to the period d.

FIG. 3 is a schematic diagram of a color display for explaining guided-mode resonance.

In FIG. 3, the width of the high refractive index layer 12 is denoted as a, and the width of the embossed layer 11 or the protective layer 13 is denoted as b. Therefore, the occupancy ratio of the high refractive index layer 12 to the period d is a ratio of the width a to the period d, and the occupancy ratio of the embossed layer 11 or the protective layer 13 to the period d is a ratio of the width b to the period d.

The waveguide conditions satisfying the above formulae (1) to (6) can be represented by the following formulae.

$$n_{eff} > n1, n3 \quad \text{Formula (7)}$$

$$\lambda > d \quad \text{Formula (8)}$$

As described above, since the effective refractive index $n_{eff}$ is determined depending on the occupancy ratio (a/d) of the high refractive index layer 12 to the period d, the following relationship can be derived.

$$n2 > n1, n3 \quad \text{Formula (9)}$$

Further, the effective refractive index $n_{eff}$ can be applied to calculate a wavelength of light guided in the color display 10 and a reflectance of light having the wavelength. That is, the effective refractive index $n_{eff}$ can be adjusted so that chromatic light having high luminance can be reflected by the color display 10 using the guided-mode resonance. The reflection of chromatic light using the guided-mode resonance can also be referred to as zeroth-order diffracted light.

For example, the wavelength of guided light satisfying the above formulae (1) to (6) can be changed only by modulating the period d. Further, when the concavo-convex surface 11S of the color display 10 includes concavo-convex surfaces having different periods, the colors of r, g and b can be displayed. Thus, a color display 10 in full-color having high designability can be provided.

As seen from the above formulae, the wavelength and reflectance of light reflected by the guided-mode resonance can be controlled by changing parameters included in the formulae for calculating the effective refractive index $n_{eff}$ and the propagation constant $\beta$, that is, the refractive indices n1 to n3, the period d, and the occupancy ratio F. Further, light reflected by the guided-mode resonance also depends on the incidence angle $\theta$ of the incident light IL incident on the color display 10. Thus, in the color display to which the guided-mode resonance is applied, the reflected light can be determined by using these parameters. When light reflected by the color display is read with a sensor, it can be readily compared with the light determined by the parameters. Therefore, the color display can be applied to machine-readable verification.

The larger the difference between the effective refractive index $n_{eff}$ and the refractive index n1 or the difference between the effective refractive index $n_{eff}$ and the refractive index n3, the higher the reflectance of light reflected by the guided-mode resonance. That is, the larger the occupancy ratio F of the high refractive index layer 12, the higher the reflectance of light. Thus, the reflectance of light is determined depending on the difference between the effective refractive index $n_{eff}$ and the refractive index n1 or the difference between the effective refractive index $n_{eff}$ and the refractive index n3. Accordingly, when the materials that can be applied to the embossed layer 11 and the protective layer 13, in other words, the refractive indices thereof, are fixed, the effective refractive index $n_{eff}$ can be controlled by the shape of the concavo-convex surface 11S1 of the embossed layer 11, the thickness of the high refractive index layer 12, and the like. This is useful for diversifying the wavelength of light reflected from the color display 10.

Figure 4:
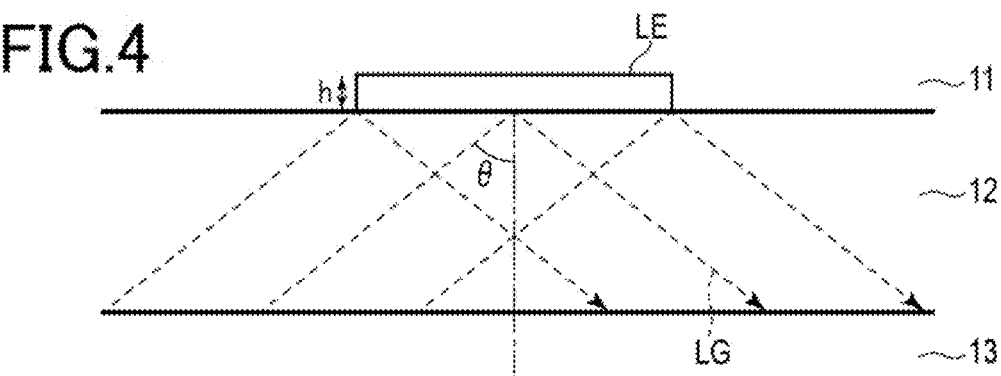
FIG. 4 is a schematic diagram illustrating a behavior of light for further explaining guided-mode resonance.

FIG. 4 is a diagram schematically illustrating a behavior of light for further explaining guided-mode resonance.

In FIG. 4, the high refractive index layer 12, the embossed layer 11 and the protective layer 13 are assumed as flat layers for ease of understanding of a waveguide mode. As described above, part of the light diffracted by the high refractive index layer 12 propagates as the propagating light LG through the high refractive index layer 12 while being totally reflected at the interface between the embossed layer 11 and the high refractive index layer 12 and the interface between the high refractive index layer 12 and the protective layer 13.

For example, when the incidence angle θ of the propagating light LG traveling to the interface of the embossed layer 11 is greater than or equal to the critical angle derived from the relationship between the refractive index n1 of the embossed layer 11 and the refractive index n2 of the high refractive index layer 12, total reflection occurs at the interface between the embossed layer 11 and the high refractive index layer 12.

However, the propagating light LG penetrates into the embossed layer 11 having a low refractive index, since it has a wavenumber having an imaginary component perpendicular to the interface. This penetrating light is referred to as evanescent light and appears as evanescent light LE shown in FIG. 4. The evanescent light LE cannot penetrate over a long distance, and has a penetration distance h of only about the wavelength. Further, the intensity decays exponentially as the distance from the interface increases. Accordingly, the evanescent light LE cannot be seen by the observer OB. However, light caused by interference of the evanescent light LE with the incident light IL becomes propagating light, which is recognized by the observer OB.

When the incidence angle of the incident light IL and the film thickness of the high refractive index layer 12 are fixed, the evanescent light LE increases in intensity in a specific wavelength band where a waveguide mode is excited. Therefore, the high refractive index layer 12 can have a uniform film thickness.

Figure 5:
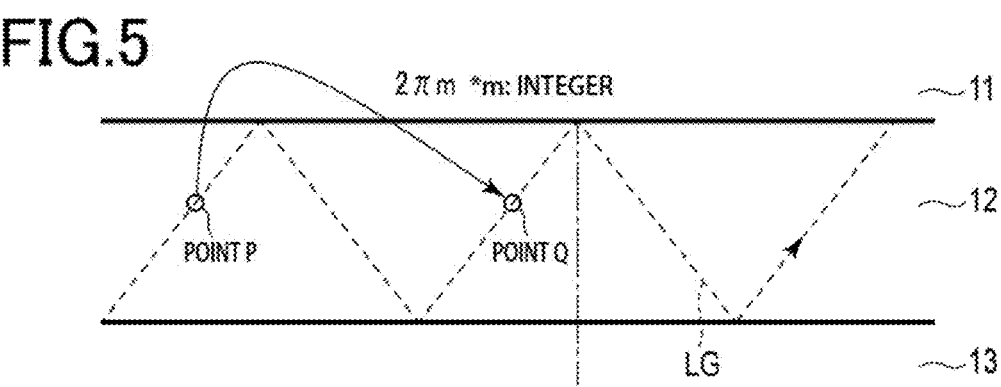
FIG. 5 is a schematic diagram illustrating a behavior of light for further explaining guided-mode resonance.

FIG. 5 is a schematic diagram illustrating a behavior of light for further explaining guided-mode resonance.

In FIG. 5, a behavior of light is schematically illustrated for further explaining the propagating light LG of FIG. 4. The intensity of the evanescent light LE increases as the intensity of the propagating light LG increases. The propagating light LG propagates while being subjected to multiple reflections at the interface between the embossed layer 11 and the high refractive index layer 12 and the interface between the protective layer 13 and the high refractive index layer 12, and excitation occurs when the phases of reflected plane waves are aligned. For example, when the propagating light LG is at a point P and when it is at a point Q after reflection, an optical path length of the light reflected in a waveguide path of the high refractive index layer 12 becomes an integer multiple of 2π. Accordingly, the phases are aligned, and excitation occurs, increasing the intensity of the propagating light LG. As the number of times of multiple reflections of the light in the waveguide path of the high refractive index layer 12 increases, the intensity of the evanescent light LE increases, enhancing the visibility of the color display 10.

The behavior of light is schematically described with reference to FIGS. 4 and 5. The color display 10 has a periodic structure having a concavo-convex surface, and a diffraction wave due to the periodic structure becomes the propagating light LG. As described above, as the number of times of multiple reflections increases, the intensity of the evanescent light LE increases. Therefore, it is desired to provide the periodic structure in a larger region.

(Orientation Angle of Concavo-Convex Surface)

Next, with reference to FIGS. 6 to 9, an orientation angle of the concavo-convex surface 11S1 will be described.

FIGS. 6(a)-6(b) are schematic diagrams illustrating a relationship between an orientation angle of a concavo-convex surface and a viewing direction of an observer.

In FIGS. 6(a)-6(b), the relationship between the viewing direction DOB of the observer OB and the orientation angle of the concavo-convex surface 11S1 is illustrated. A direction in which convexities S1A extend is the direction in which the wave shape of the concavo-convex surface 11S1 in the color display 10 in FIG. 1 is continuous in the depth direction of the drawing.

As shown in FIG. 6(a), the convexities S1A of the color display 10 extend in one direction. In the example shown in FIG. 6(a), the convexities S1A extend in the vertical direction of the drawing. The orientation angle of the concavo-convex surface 11S1 is an angle formed between the direction in which the convexities S1A extend and a reference direction which is an arbitrary direction extending parallel to the plane in which the color display 10 extends. In this example, the reference direction is the horizontal direction of the drawing. In this case, an angle formed between the reference direction and the direction in which the convexities S1A extend is 90°. Accordingly, the orientation angle of the concavo-convex surface 11S1 is 90°. A projection direction in which the viewing direction DOB of the observer OB is projected onto the plane in which the color display 10 extends is the vertical direction of the drawing. The projection direction is parallel to the direction in which the convexities S1A extend. That is, the concavo-convex surface 11S1 is oriented vertically as seen by the observer OB.

In the example shown in FIG. 6(b), the convexities S1A extend in the horizontal direction of the drawing. Since the horizontal direction of the drawing is the reference direction, an angle formed between the reference direction and the direction in which the convexities S1A extend is 0°. Accordingly, the orientation angle of the concavo-convex surface 11S1 is 0°. A projection direction in which the viewing direction DOB of the observer OB is projected onto the plane in which the color display 10 extends is the vertical direction of the drawing. The projection direction is perpendicular to the direction in which the convexities S1A extend. That is, the concavo-convex surface 11S1 is oriented horizontally as seen by the observer OB.

FIG. 7 is a graph showing a relationship between an orientation angle of a concavo-convex surface and a spectrum of reflectance for each wavelength.

FIG. 7 shows the relationship between the wavelength of the reflected light RL reflected by the color display 10 and the reflectance. In FIG. 7, the spectrum indicated by the solid line is a spectrum obtained with the color display 10 having the concavo-convex surface 11S1 vertically arranged, and the spectrum indicated by the dotted line is a spectrum obtained with the color display 10 having the concavo-convex surface 11S horizontally arranged. When obtaining a spectrum of the reflected light RL, a direction from a light receiving element of a measurement device to the color display 10 is set as a measurement direction, and the measurement direction is regarded as the viewing direction DOB described above.

As shown in FIG. 7, regardless of whether the concavo-convex surface 11S of the color display 10 is arranged vertically or horizontally, the color display 10 can reflect red light indicated by a spectrum r, green light indicated by a spectrum g, and blue light indicated by a spectrum b. In all the spectra r, g and b, the peak intensities of the spectra r, g and b indicated by the solid line are higher than the peak intensities of the spectra r, g and b indicated by the dotted line. Therefore, the color display 10 can have the concavo-convex surface 11S oriented vertically as seen by the observer OB. In other words, the color display 10 can display an intended image recorded on the concavo-convex surface 11S when the concavo-convex surface 11S is oriented vertically as seen by the observer OB.

Figure 8:
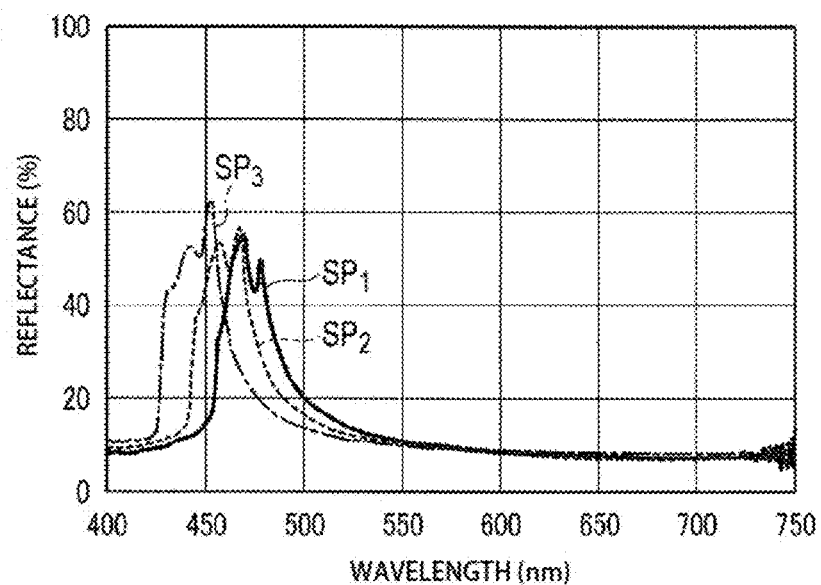
FIG. 8 is a graph showing a relationship between a tilt of a color display and a reflectance.

FIG. 8 is a graph showing a relationship between a tilt of a color display and a reflectance.

Figure 9:
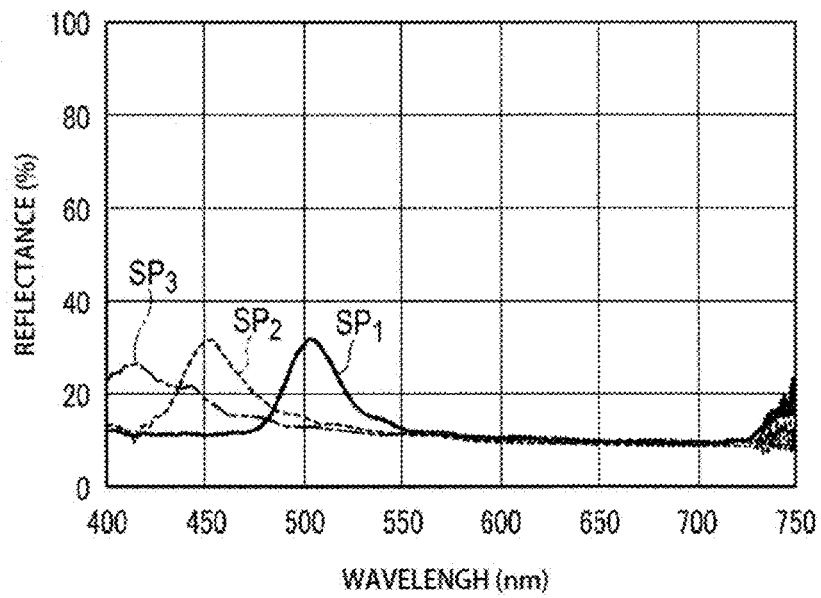
FIG. 9 is a graph showing a relationship between a tilt of a color display and a reflectance.

FIG. 9 is a graph showing a relationship between a tilt of a color display and a reflectance.

FIGS. 8 and 9 show, as in FIG. 7, the relationship between the wavelength of the reflected light RL reflected by the color display 10 and the reflectance. In both FIGS. 8 and 9, a spectrum SP1 indicated by the solid line, a spectrum SP2 indicated by the dotted line and a spectrum SP3 indicated by the dot-and-dash line represent spectra obtained when the color display 10 is tilted by 20°, 30° and 40° from a reference position, respectively. The reference position is a position of the color display 10 when it is located on a horizontal surface. FIG. 8 shows a spectrum obtained with the vertically arranged color display 10. On the other hand, FIG. 9 shows a spectrum obtained with the horizontally arranged color display 10.

As shown in FIG. 8, in the color display 10 vertically arranged, a difference in peak wavelength between the spectrum $SP_1$, obtained when the color display 10 is tilted by 20° from the reference position, and the spectrum $SP_3$, obtained when the color display 10 is tilted by 40° from the reference position, is less than 50 nm.

On the other hand, as shown in FIG. 9, in the color display 10 having the concavo-convex surface 11S horizontally arranged, a difference in peak wavelength between the spectrum $SP_1$, obtained when the color display 10 is tilted by 20° from the reference position, and the spectrum $SP_3$, obtained when the color display 10 is tilted by 40° from the reference position, is 50 nm or more and less than 100 nm.

Thus, the concavo-convex surface 11S of the color display 10 can be oriented vertically as seen by the observer OB in order to suppress a change in the color of the reflected light RL reflected by the color display 10 when the color display 10 is tilted from the reference position. In other words, the color display 10 having the concavo-convex surface 11S oriented vertically as seen by the observer OB can be configured to display an intended image recorded on the concavo-convex surface 11S.

The reflected light RL of the color display 10 can include first-order diffracted light. First-order diffracted light is reflected along a plane perpendicular to the direction in which the convexities S1A extend and perpendicular to a plane in which the color display 10 extends. Therefore, when the color display 10 has the concavo-convex surface 11S1 oriented horizontally as seen by the observer OB, the observer OB can see the first-order diffracted light reflected from the color display 10. Further, the observer OB may misidentify the first-order diffracted light that he or she sees as zeroth-order diffracted light, that is, the reflected light RL due to the guided-mode resonance. When the color display 10 has the concavo-convex surface 11S1 oriented vertically as seen by the observer OB, it is possible to reduce the risk that the observer OB may misidentify the first-order diffracted light as zeroth-order diffracted light.

(Effect of Color Display)

With reference to FIGS. 10 to 16(b), effects of the color display 10 will be described.

Figure 10:
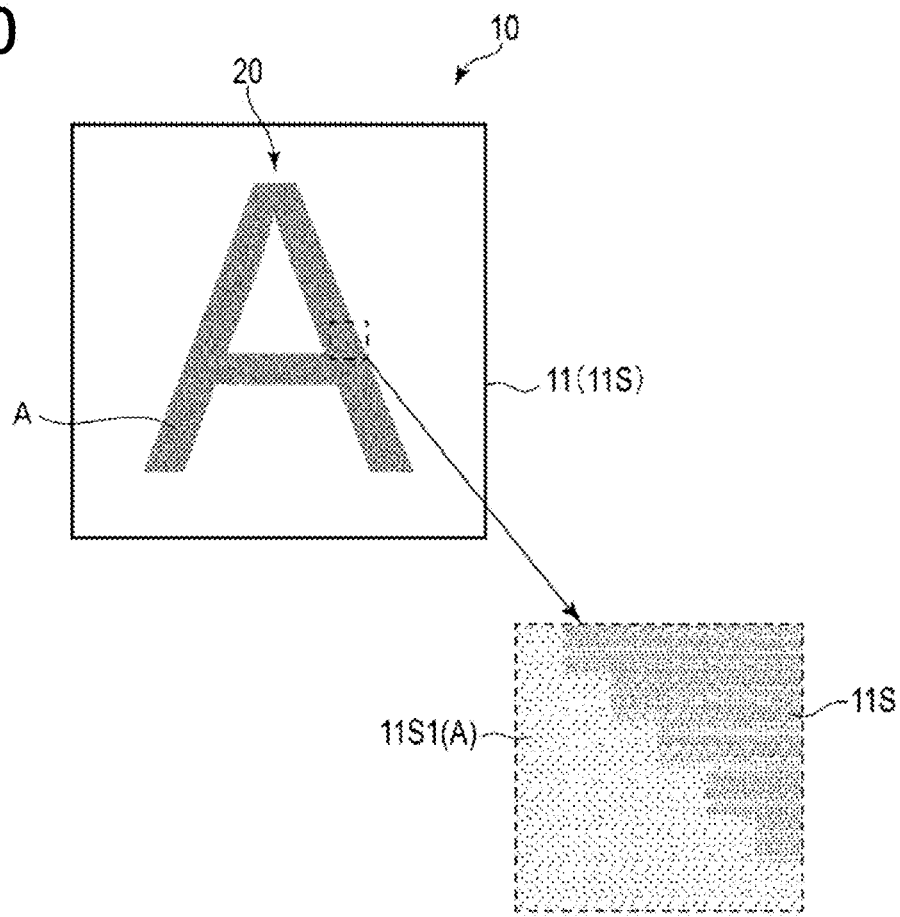
FIG. 10 is a schematic diagram illustrating a region including a concavo-convex surface in a color display of the first embodiment.

FIG. 10 is a schematic diagram illustrating a region including a concavo-convex surface in a color display of the first embodiment.

As shown in FIG. 10, a motif 20 is formed of a region A including the concavo-convex surface 11S1, which is a periodic structure, disposed on a part of the surface 11S of the embossed layer 11. Since the color of reflected light can be controlled by the period as described above, the formed motif 20 can be displayed in color. When the periodic structure included in the region A is composed of a plurality of periods, a colorful motif 20 can be displayed. In addition, although the amount of change is small, the colors can also be changed depending on the height difference between adjacent pairs of the convexities and concavities on the concavo-convex surface 11S1. Due to the concavo-convex information of the concavo-convex surface 11S1 included in a region A or the concavo-convex information of the concavo-convex surface 11S1 included in another region A, it is possible to display a colorful motif 20 with a high degree of freedom, providing a color display 10 having high designability.

Further, as described above, when the concavo-convex surface 11S is vertically oriented, it is possible to reduce the risk that the observer OB seeing the motif 20 may misidentify the first-order diffracted light as zeroth-order diffracted light.

Figure 11A:
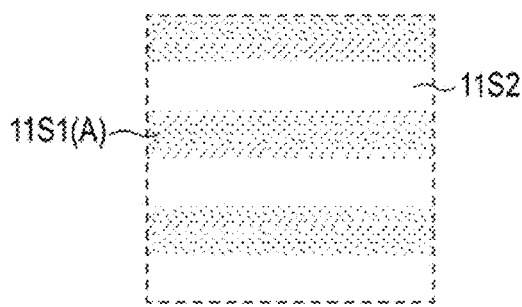
FIGS. 11(a) and 11(b) are schematic diagrams illustrating a region A.
Figure 11B:
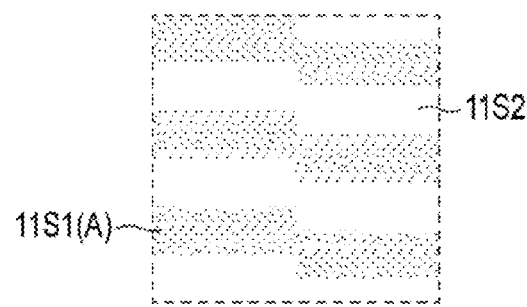

FIGS. 11(a) and 11(b) are schematic diagrams for explaining the region A.

FIGS. 11(a) and 11(b) more specifically illustrates the region A. In FIG. 11(a), the regions A have a strip shape having a longitudinal direction and a lateral direction, and the concavo-convex surface 11S is vertically oriented in the longitudinal direction. This intends to increase the number of times of multiple reflections of the propagating light LG caused by the periodic structure. As the number of times increases, the intensity of the evanescent light LE increases and the reflectance of zeroth-order diffracted light is improved. Accordingly, a highly visible color display 10 can be provided for the observer OB. Since the lateral direction is directly related to a pixel of the motif, the dimension in the lateral direction is desired not to be resolved by the observer in order to reproduce a fine motif, and can be 100 µm or less, and more preferably 60 µm or less. Further, since the evanescent light LE is enhanced in the longitudinal direction, the dimension in the longitudinal direction is preferably larger than that in the lateral direction, and can be at least twice or more the lateral dimension in order to ensure that the reflectance of zeroth-order diffracted light is improved, and can be 30 times or less considering the use as a pixel and the degree of freedom in motif formation.

Further, the regions A are separated from each other in the lateral direction perpendicular to the longitudinal direction. A separation region 11S2 may be the surface 11S of the embossed layer 11 or may include another element. For example, when the region 11S2 is a region containing a coloring ink, the zeroth-order diffracted light can be observed in the region A only at a specific angular range. On the other hand, the region 11S2 can be observed independently of the angle. Accordingly, the colors of the motif 20 or the motif itself can be changed depending on the angle, and the change can be used as a criterion for determining authenticity.

Although the coloring ink is described as an example of the region 11S2, the region 11S2 is not limited to the coloring ink, and may include a periodic structure different from that of the concavo-convex surface 11S1 formed of the region A, a scattering structure having no periodicity, and an optically variable element such as a liquid crystal material or a magnetic pigment.

Further, as shown in FIG. 11(b), when the concavo-convex surfaces 11S1 formed of the regions A have the same period, the longitudinal end sides of the regions A can be connected to each other. This connection can increase the number of times of multiple reflections of the propagating light LG caused by the periodic structure, enhancing the intensity of the evanescent light LE and improving the reflectance of the zeroth-order diffracted light. Accordingly, a highly visible color display 10 can be provided for the observer.

When at least 20 μm or more, and more preferably 50 μm or more of the longitudinal end sides of the regions A are connected to each other, the evanescent light LE is expected to be enhanced without hindering multiple reflections of the propagating light LG. As long as the above values are satisfied, the effect of the embodiment of the present invention can be achieved even when the longitudinal axes of the regions A are slightly misaligned with each other as shown in FIG. 11(b). The misalignment can be within 50% of the length of the end side. With this configuration, the evanescent light LE can be sufficiently enhanced. Further, the misalignment may be 10% or less. With this configuration, the evanescent light LE can be enhanced to the extent substantially the same as in the case where there is no misalignment.

The contour of the region A in the longitudinal direction can be a straight line, a curved line, or a combination thereof. The contour of the region A in the lateral direction can be a straight line, a curved line, or a combination thereof. The contour shape of the region A can be a rectangle, a rectangle with rounded corners, or an octagon. Further, the contour of the region A in the longitudinal direction can be a curved line, and the contour of the region A in the lateral direction can be a straight line. Since the region A is directly related to a pixel, the degree of freedom of a motif to be displayed can be increased by emphasizing the boundary between the region A and the region 11S2, or obscuring the boundary instead of emphasizing it. When the contour of the region A at the boundary between the region A and the region 11S2 is a straight line, the boundary can be emphasized. On the other hand, when the contour of the region A at the boundary between the region A and the region 11S2 is a curved line, the boundary can be prevented from being emphasized. The curved line can be a semi-circle, a semi-elliptical shape, or a free curve. Further, the curved line may have a constant or variable radius of curvature. The radius of curvature may be smaller than the length of the end side, and can be 1% or less of the length of the end side.

Further, all the regions A may not necessarily have the same dimension in the lateral direction as long as the dimension of the end side of the region A is smaller than the other dimensions. In addition, the dimension in the lateral direction can be reduced toward the connecting portion.

As described above, the dimension of the region A in the lateral direction can be changed to change the reflection spectrum of the zeroth-order diffracted light expressed in the region A of the motif. Therefore, even if the wavelength is the same, the saturation varies depending on the reflectance in the region A, achieving rich color expression.

Further, in the color display 10, the periodic structure of the concavo-convex surface 11S1 disposed in the region A includes a plurality of periods, and the longitudinal dimension of the region A can be an integer multiple of a value obtained by using the least common multiple of the plurality of periods as a dividend and the greatest common divisor of the plurality of periods as a divisor.

As described above, since the diffracted wave from the periodic structure of the concavo-convex surface 11S1 is finally emitted as zeroth-order diffracted light, periods on the end portions of the concavo-convex surfaces 11S1 may be misaligned depending on the dimension in the longitudinal direction when positioning the periodic structures of the concavo-convex surfaces 11S1 in the region A, leading to a decrease in intensity of the zeroth-order diffracted light. However, by satisfying the dimensional restriction described above, misalignment of periods does not occur in all the plurality of periods used in the region A. Accordingly, a highly visible color display 10 without causing a decrease in intensity can be provided.

According to the above configuration, even when the concavo-convex surfaces 11S formed of the regions A connected to each other have periods different from each other, misalignment of periods does not occur at the end portions. Therefore, a color display 10 can be provided without causing a decrease in intensity.

Figure 12A:
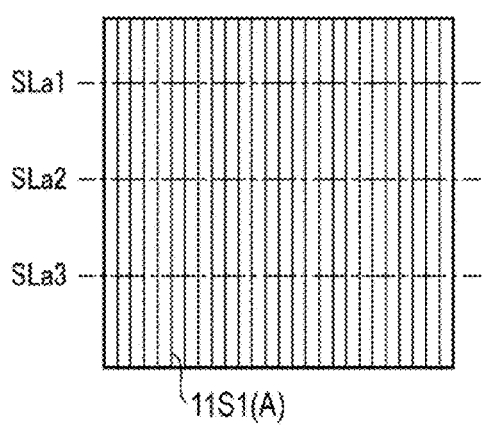
FIGS. 12(a) and 12(b) are schematic diagrams for explaining an orientation of a concavo-convex surface included in the region.
Figure 12B:
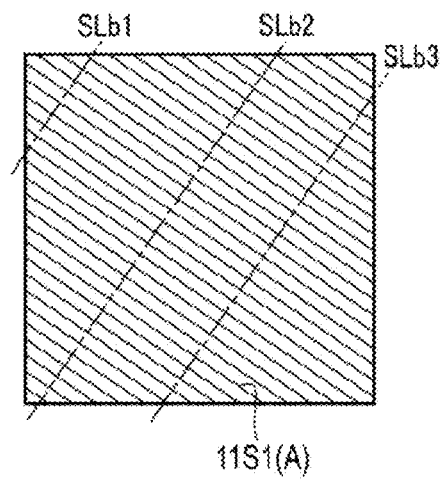

FIGS. 12(a) and 12(b) are schematic diagrams for explaining an orientation of a concavo-convex surface included in the region.

FIGS. 12(a) and 12(b) illustrates a schematic diagram in which the periodic structure of the concavo-convex surface 11S1 is disposed in the region A.

As described above, in the color display 10, the periodic structure of the concavo-convex surface 11S1 can be vertically arranged in the longitudinal direction of the region A. FIG. 12(a) illustrates that the orientation angle of the concavo-convex surface 11S1 is arranged at 90° as in FIG. 6(a), and FIG. 12(b) illustrates that the orientation angle of the concavo-convex surface 11S1 is arranged at 45°. In order to increase the intensity of the propagating light LG, a long waveguide path is required. A short waveguide path causes a decrease in intensity of the propagating light LG. The waveguide paths in a cross section SLa1, a cross section SLa2, and a cross section SLa3 of FIG. 12(a) have the same length. In FIG. 12(a), the waveguide lengths are the same in all the cross sections SLa.

On the other hand, the waveguide paths in a cross section SLb1, a cross section SLb2, and a cross section SLb3 of FIG. 12(b) have lengths different from each other. In FIG. 12(b), the waveguide length varies depending on the cross section to be viewed, causing a decrease in intensity of the propagating light LG. Therefore, in order to increase the intensity of the propagating light LG, the orientation angle of the concavo-convex surface 11S1 is preferably 90° or 0°. Further, as described above, when the orientation angle of the concavo-convex surface 11S1 is 0°, the first-order diffracted light may be included. Therefore, the orientation angle of the concavo-convex surface 11S1 is more preferably 90°.

Figure 13A:
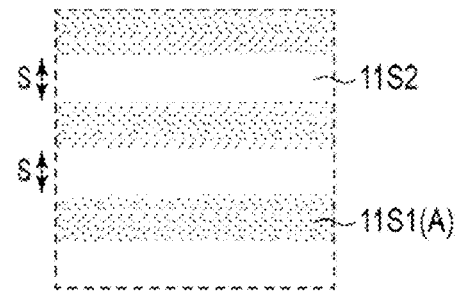
FIGS. 13(a) and 13(b) are schematic diagrams for explaining a region of a color display.
Figure 13A:
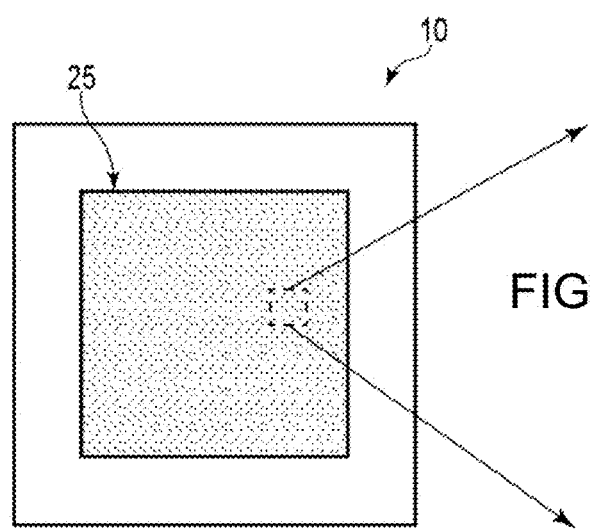
Figure 13B:
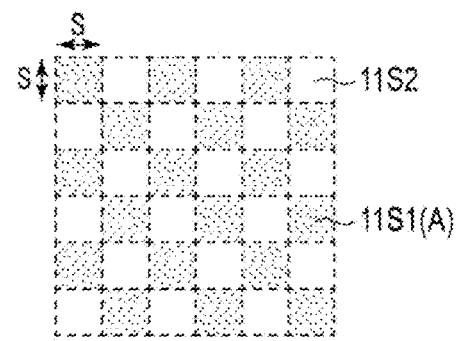

FIGS. 13(a) and 13(b) are schematic diagrams for explaining a region of a color display.

FIGS. 13(a) and 13(b) schematically illustrates the effect of the present disclosure using the color display 10. Specifically, FIG. 13(a) illustrates that a motif 25 in the color display 10 is formed of the regions A. The regions A have a strip shape having a longitudinal direction and a lateral direction, and the concavo-convex surface 11S1 is vertically oriented in the longitudinal direction. Further, the regions A have a dimension S in the lateral direction, and are separated from each other by the dimension S. The separation region 11S2 is configured with a concavo-convex surface 11S1 that reflects light at an angle different from that of the zeroth-order diffracted light in the region A. On the other hand, FIG. 13(b) illustrates a grid of squares having the dimension S, in which the concavo-convex surfaces 11S1 and the separation regions 11S2 are alternately arranged to form the motif 25. It is assumed that the surface areas of the regions A and the separation regions 11S2 used in FIG. 13(a) and FIG. 13(b) are equal.

Figure 14:
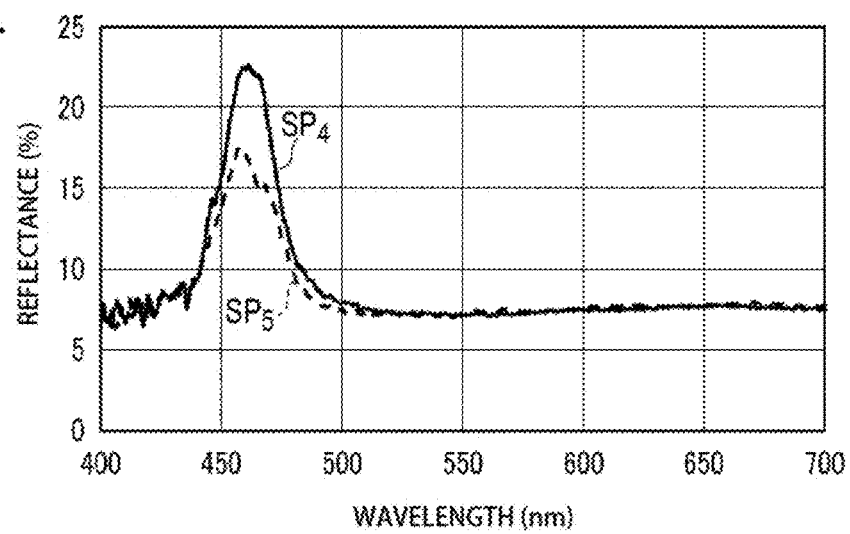
FIG. 14 is a graph showing a relationship between an arrangement of regions of a color display and a reflectance.

FIG. 14 is a graph showing a relationship between an arrangement of regions of a color display and a reflectance.

FIG. 14 shows a relationship between the reflectance and the wavelength of the zeroth-order diffracted light due to the guided-mode resonance in the motif 25 of the color display 10 shown in FIGS. 13(a) and 13(b). FIG. 14 shows the result of measuring a spectral reflectance spectrum of the color display 10, in which the concavo-convex surface 11S1 of the embossed layer 11 uses a sinusoidal structure having a period of 300 nm and is formed with a height difference of 110 nm between adjacent pairs of the convexities and concavities, the high refractive index layer 12 is made of $TiO_2$ having a refractive index of 1.95, and the embossed layer 11 and the protective layer 13 have a refractive index of 1.45. In FIG. 14, a spectrum $SP_4$ indicated by the solid line corresponds to that of the color display 10 shown in FIG. 13(a), and a spectrum $SP_5$ indicated by the dotted line corresponds to that of the color display 10 shown in FIG. 13(b). Comparing the reflectances of the zeroth-order diffracted lights, the reflectance of the color display 10 in FIG. 13(a) is found to be higher than that of the color display 10 in FIG. 13(b) by approximately 30% although the surface areas are the same.

As described above, the color display 10 of FIG. 13(a) has the number of times of multiple reflections of the propagating light LG caused by the periodic structure greater than that in the color display 10 of FIG. 13(b), and thus has an enhanced evanescent light LE and an improved reflectance of the zeroth-order diffracted light. As the reflectance of the zeroth-order diffracted light increases, the visibility of the observer OB increases and the ease of authenticity determination is improved.

Since the dimension S of the region A in the lateral direction is related to the resolution constituting the motif 25, the dimension is desired not to be resolved when the color display 10 is observed, and can be 100 µm or less, and more preferably 60 µm or less.

Figure 15:
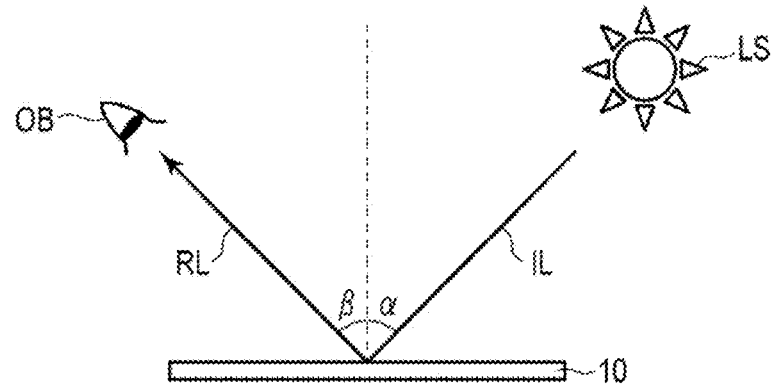
FIG. 15 is a schematic diagram schematically illustrating a state in which an observer observes a color display.

FIG. 15 is a schematic diagram schematically illustrating a state in which an observer observes a color display.

As shown in FIG. 15, when the observer OB observes the color display 10, the observer OB can observe the zeroth-order diffracted light reflected by the guided-mode resonance generated in the region A in a direction of specular reflection. An incidence angle α of the incident light IL from the light source LS is equal to a reflection angle β of the zeroth-order diffracted light, which is the reflected light RL. The wavelength of the reflected light RL is included in the visible light range, so the color display 10 can display a chromatic image.

Figure 16A:
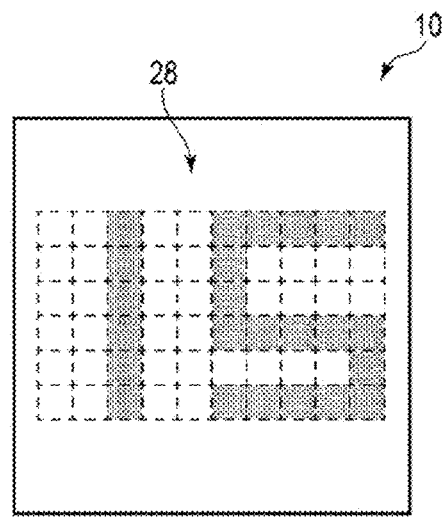
FIGS. 16(a) and 16(b) are schematic diagrams illustrating examples of an effect of a color display.
Figure 16B:
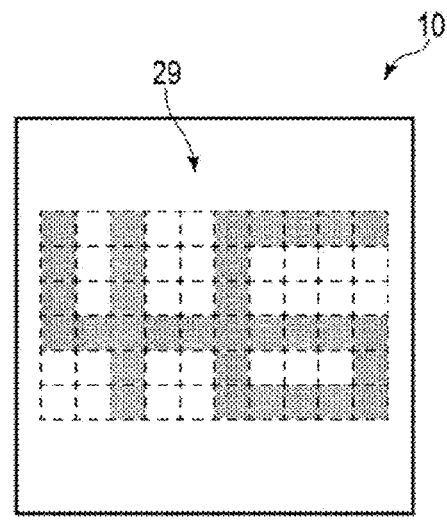

FIGS. 16(a) and 16(b) are schematic diagram illustrating an example of an effect of a color display.

FIGS. 16(a) and 16(b) show an example of the effect of the color display 10 including the region A and the region 11S2 containing a coloring ink. In the region A, the zeroth-order diffracted light can be observed at the angle β. On the other hand, the region 11S2 can be observed independently of the angle. Accordingly, the appearance of a motif 28 can be changed depending on the observation angle. For example, when the incident light IL is incident at the incidence angle α, the motif 28 shown in FIG. 16(a) appears on the color display 10 when observed at an angle different from the reflection angle β. On the other hand, a motif 29 shown in FIG. 16(b) appears when observed at an angle of the reflection angle β. A new motif 29 can be displayed by combining the elements of the region A with the motif 28 displayed by the region 11S2 by utilizing the characteristics of the respective regions. Since the observer OB can recognize the change of the motif by changing the observation angle, the change of the motif can be used as a criterion for determining authenticity. Further, not only by combining the regions, but also, for example, by constituting the region 11S2 with the concavo-convex surface 11S1 that produces reflection at an angle different from that in the region A, a completely different motif can be displayed depending on the observation angle.

(Method for Determining Authenticity)

As described referring to FIG. 15, when the observer OB observes the color display 10, the observer OB can observe the zeroth-order diffracted light reflected by the guided-mode resonance in a direction of specular reflection. In other words, when the observer OB observes the color display 10, chromatic reflected light appears in a direction of specular reflection and disappears in a direction different from the direction of specular reflection. Therefore, this can be used as a method for determining authenticity of the color display 10.

On the other hand, since the reflected light of first-order diffracted light is split and reflected in various directions, color transition can be observed as the observer OB changes the observation direction. However, the observer OB cannot determine which color in which direction is genuine. Therefore, the zeroth-order diffracted light can be used for determining authenticity. Further, as described above, it is effective not only as a design but also as a method for determining authenticity to set the orientation angle of the concavo-convex surface 11S1 to 90° so that the first-order diffracted light from the concavo-convex surface 11S1 is not seen by the observer OB.

(Method for Producing Color Display)

Figure 17:
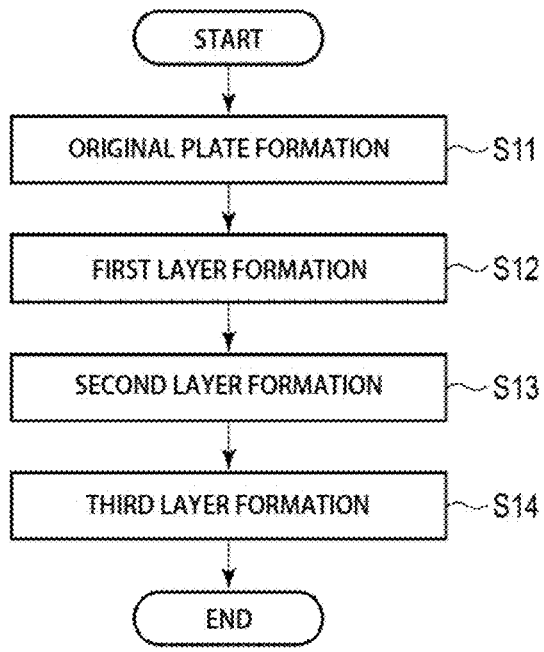
FIG. 17 is a flowchart for explaining a procedure for producing a color display.

With reference to FIG. 17, the method for producing the color display 10 will be described.

FIG. 17 is a flowchart for explaining a procedure for producing a color display.

As shown in FIG. 17, a method for producing the color display 10 includes: an original plate forming step for forming a stamper (step S11), a first layer forming step for forming an embossed layer 11 (step S12), a second layer forming step for forming a high refractive index layer 12 (step S13), and a third layer forming step for forming a protective layer 13 (step S14).

In the original plate forming step for forming a stamper, an original plate is first formed by lithography using electron beam drawing. In formation of an original plate, a positive resist material is prepared. Then, a resist layer is formed by the resist material. Subsequently, the layer is irradiated with an electron beam according to the shape of the surface 11S of the embossed layer 11. Since the resist layer is made of the positive resist, a portion of the resist layer to be removed from the resist layer after development is irradiated with an electron beam. Due to the positive resist material being used, the portion irradiated with an electron beam is removed from the resist layer after development.

Further, a stamper is produced from the formed original plate by electroforming for transferring the concavo-convex shape of the original plate to the embossed layer 11. The concavo-convex shape of the stamper is transferred to a resin layer for forming an embossed layer 11. Thus, the embossed layer 11 is formed.

In the first layer forming step for forming an embossed layer 11, a synthetic resin for forming an embossed layer 11 is first prepared. The synthetic resin for forming an embossed layer 11 may be a thermoplastic resin, a thermosetting resin or a photocuring resin. The synthetic resin may be, for example, acrylic resin, urethane resin or urethane acrylic resin. After a coating film containing a synthetic resin for forming an embossed layer 11 is applied, the concavo-convex shape of the transfer plate is transferred to the coating film to form the embossed layer 11.

In the second layer forming step for forming a high refractive index layer 12, a high refractive index layer 12 is first formed to cover the surface 11S of the embossed layer 11. A dielectric for forming a high refractive index layer 12 may be a metal compound, a silicon oxide, or the like. The metal compound may be a metal oxide, a metal sulfide or a metal fluoride. Examples of the metal compound include zinc oxide, titanium oxide, niobium oxide (NbO2) and zinc sulfide.

The refractive index of the metal oxide can be changed from a first value to a second value by changing the degree of oxidation of the metal oxide. Among the metal oxides, titanium oxide is suitable as a material for forming a high refractive index layer 12 due to its high refractive index. The refractive index of the titanium oxide can be changed from a first value to a second value by changing the volume density of the titanium oxide from a first value to a second value. In general, the higher the volume density of the titanium oxide forming the high refractive index layer 12, the higher the refractive index of the high refractive index layer 12.

The high refractive index layer 12 can be formed by a deposition method. The deposition method for forming the high refractive index layer 12 may be a chemical deposition method or a physical deposition method. Examples of the physical deposition method include sputtering and vacuum vapor deposition.

In the third layer forming step for forming a protective layer 13, a synthetic resin for forming a protective layer 13 is first prepared. The synthetic resin for forming a protective layer 13 may be a synthetic resin applicable to formation of the embossed layer 11. After a coating film containing a synthetic resin for forming a protective layer 13 is prepared, the coating film is applied to the high refractive index layer 12 to cover the high refractive index layer 12. Then, the coating film is cured to obtain a color display 10 having the protective layer 13.

As described above, according to the first embodiment of the color display, authentication medium, and method for determining authenticity of the color display, the following effects can be achieved.

(1) When light is incident on the color display 10 having a configuration in which the embossed layer 11, the high refractive index layer 12 and the protective layer 13 are laminated in this order, and the embossed layer 11 has the concavo-convex surface 11S on the surface 11S, a wavelength component satisfying the waveguide conditions is reflected.

(2) The wavelength to be guided can be controlled by the period d of the concavo-convex surface 11S. When the period d of the concavo-convex surface 11S of the color display 10 includes different periods, the colors of r, g and b can be displayed, providing a color display 10 in full-color having high designability.

(3) When light from the light source LS is incident on the color display 10, a propagating light LG propagating through the high refractive index layer 12 is generated at wavelengths at which a part of the light diffracted by the high refractive index layer 12 satisfies the waveguide conditions. When the propagating light LG sufficiently satisfies the waveguide length, the phases of the light propagating through multiple reflections are aligned with each other, whereby excitation occurs, increasing the intensity of the propagating light LG. This increases the intensity of light reflected in the region A, providing a highly visible color display 10.

(4) When the periods of the periodic structure disposed in the region A are arranged in the longitudinal direction of the region A, the intensity of the propagating light LG is increased, providing a color display 10 having high luminance.

(5) When observing the color display 10, the observer OB can observe the zeroth-order diffracted light reflected by the guided-mode resonance in a direction of specular reflection, and cannot observe it in a direction different from the direction of specular reflection. Therefore, this can be used as a method for determining authenticity.

Second Embodiment

With reference to the drawings, a second embodiment of a color display, an authentication medium, and a method for determining authenticity of the color display will be described. The color display of the second embodiment differs from the color display 10 of the first embodiment in that the display region of the motif 25 displayed on the color display 10 of the first embodiment includes a region B different from the region A constituting the motif 25. Therefore, the difference between the color display of the second embodiment and the color display 10 of the first embodiment will be described in detail below. In the color display of the second embodiment, components common to those in the color display 10 of the first embodiment are denoted by the same reference signs as in the color display 10 of the first embodiment, and the detailed description thereof will be omitted. In the following description, a configuration of the color display and a method for determining authenticity of the color display will be described in sequence.

(Configuration of Color Display)

With reference to FIGS. 18 to 26, a structure of a color display of the second embodiment will be described.

Figure 18:
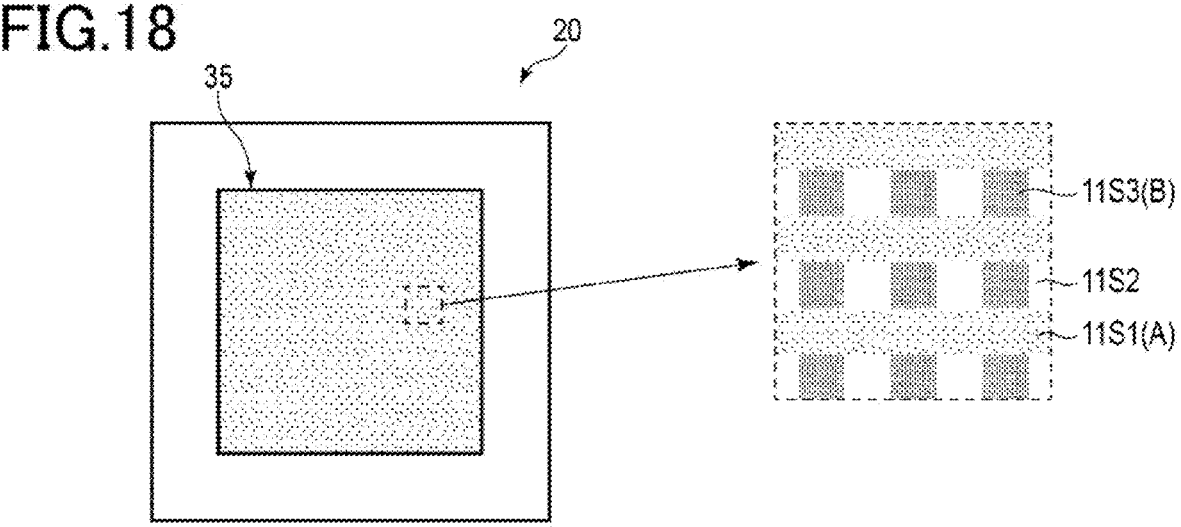
FIG. 18 is a schematic diagram illustrating a region in a color display of a second embodiment.

FIG. 18 is a schematic diagram illustrating a region including a concavo-convex surface on a color display of the second embodiment.

In a color display 20 shown in FIG. 18, a motif 35 including the region B different from the region constituting the motif 25 is formed in the display region of the motif 25 displayed on the color display 10 of FIG. 13(a). The region B is configured with a dimension smaller than that of the region A, and the regions B are alternately arranged in at least the longitudinal direction or the lateral direction of the region A.

The region B includes a mixed periodic structure 11S3 having a plurality of different periods and produces diffracted light due to the periodic structure. In this configuration, unlike the guided-mode resonance effect in the region A, simple diffracted light can be emitted from the display surface. Accordingly, the region B can be designed without considering multiple reflections of the propagating light LG, and achieve a sufficient effect with the dimension smaller than that of the region A. Further, since the light can be emitted at an angle different from that of the zeroth-order diffracted light of the region A, it is possible to form a motif having an appearance different from that of the motif 35 formed of the region A.

The display region of the color display 20 can include the separation region 11S2 in addition to the region A and the region B, and can further include elements described referring to the color display 10.

In the mixed periodic structure 11S3 having a plurality of different periods disposed in the region B, light can be emitted as the first-order diffracted light due to interference with the mixed periodic configuration of the laminated high refractive index layer 12. Since it is easiest to design the first-order diffracted light in order to strongly emit the diffracted light, the first-order diffracted light can be used.

When using the first-order diffracted light, it can be designed by the following formula (10).

$$m\lambda = d(\sin \gamma + \sin \Delta) \quad \text{Formula (10)}$$

In the formula (10), d is a period of the periodic structure, $\lambda$ is a wavelength of light reflected from the periodic structure, $\gamma$ is an incidence angle of the incident light, and $\Delta$ is a diffraction angle of light diffracted by the periodic structure.

When the periodic structure has the same period d, the reflected first-order diffracted light is split. As a result, when the observer OB observes the region B, the observer OB can observe an image having the iridescent color displayed by the periodic structure. In particular, when the period d is 500 nm or more and 20,000 nm or less, the periodic structure exhibits a clear iridescent color.

On the other hand, the region B can also reflect achromatic light when it is designed as described below. First, a period d calculated by using the above formula (10) is set as a reference period dr. Then, a plurality of periods d are discretely set in a positive direction relative to the reference period dr, that is, in a range larger than the reference period dr, and a plurality of periods d are discretely set in a negative direction relative to the reference period dr, that is, in a range smaller than the reference period dr. A periodic structure corresponding to the plurality of periods d thus set is designed.

According to the above configuration, since light of a plurality of wavelengths is mixed, the region B formed of an achromatic color, that is, white light is observed at a specific angular range.

When designing the above plurality of periods d, the period d that is able to reflect light having a wavelength with high luminous efficiency function can be set as the reference period dr. The light having a wavelength with high luminous efficiency function may be, for example, green light having a wavelength of 540 nm or more and 560 nm or less. In this case, green light having a high luminous efficiency function and light having a luminous efficiency function similar to that of green light are included in the light reflected from the mixed periodic structure 11S3. Therefore, the region B displayed by the mixed periodic structure 11S3 is easily visible. Further, light reflected by the mixed periodic structure 11S3 can include red light having a wavelength longer than that of green light and blue light having a wavelength shorter than green light. Accordingly, the mixed periodic structure 11S3 can be easily configured to reflect achromatic light.

In the mixed periodic structure 11S3, the density of a multi-level surface S2A having the reference period dr can be the highest, and the density of a periodic structure in the mixed periodic structure 11S3 can be reduced as the period d deviates from the reference period dr. With this configuration, the intensity of the first-order diffracted light reflected to an observation position other than the specific observation position described above can be reduced.

The mixed periodic structure 11S3 that can reflect achromatic light preferably satisfies the following formulae (11) to (13). In the following formula (11), an r value is a parameter that contributes to a range $\theta R'$ of a diffraction angle $\theta$.

[Math. 4]
$$\theta_R' = 2\left(\frac{-90}{255} \cdot r + 90\right) \quad \text{Formula (11)}$$

[Math. 5]
$$\theta = \frac{\theta_R'}{30} \quad \text{Formula (12)}$$

[Math. 6]
$$\rho_n' = (\cos\theta_n')^{\log(0.01)/\log\left(\cos\left(\frac{\theta_R'}{2}\right)\right)} \quad \text{Formula (13)}$$

Figure 19:
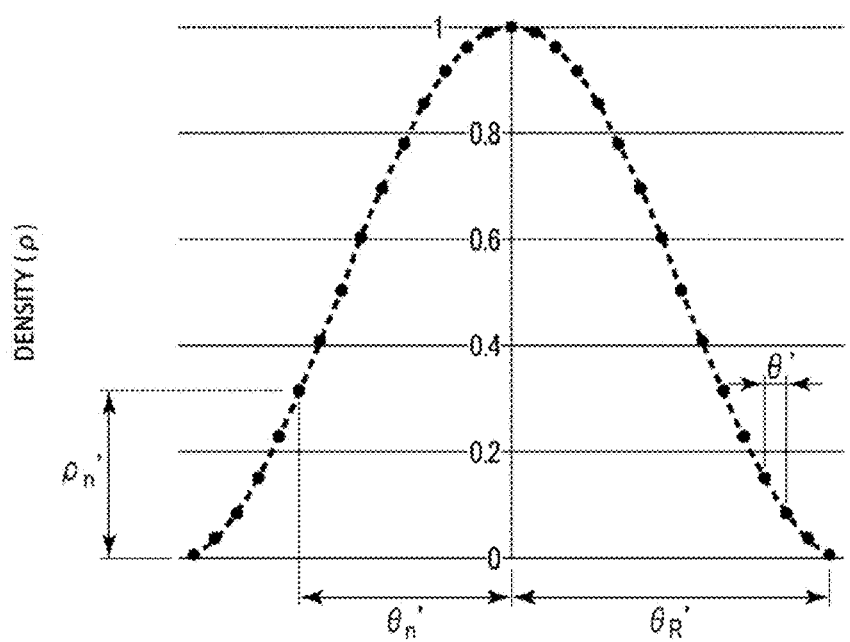
FIG. 19 is a graph showing a relationship between an arrangement density of a mixed periodic structure and a diffraction angle.

FIG. 19 is a graph showing a relationship between an arrangement density of a mixed periodic structure and a diffraction angle.

FIG. 19 shows a curve satisfying the above formulae (11) to (13). As shown in FIG. 19, in the above formulae (11) to (13), $\theta_R'$ is a range of the diffraction angle $\theta$. $\theta'$ is a discrete interval, that is, a difference between the diffraction angle $\theta$ of the first-order diffracted light in a periodic structure and the diffraction angle $\theta$ of the first-order diffracted light in another periodic structure having the next larger period d or the next smaller period d. $\theta_n'$ is a discrete angle, that is, a difference between the diffraction angle $\theta$ of the first-order diffracted light in a periodic structure and the diffraction angle $\theta$ of the first-order diffracted light in another periodic structure having a reference period dr. $\rho n'$ is a density of the periodic structure having a specific discrete angle $\theta_n'$ in the entire mixed periodic structure 11S3. The r value is a parameter that contributes to the range $\theta_R'$ of the diffraction angle $\theta$. The r value is a parameter important for reflecting achromatic light by the mixed periodic structure 11S3, and can be 221 or less.

In the first-order diffraction angle of the periodic structure of the mixed periodic structure 11S3 satisfying formulae (11) to (13), the discrete angle $\theta n'$ which is a diffraction angle $\theta$ of the multi-level surface S2A changes by the discrete interval $\theta'$ relative to 0° corresponding to the reference period dr. In the mixed periodic structure 11S3, the density of the periodic structure having the reference period dr has a maximum value, and the density of the periodic structure decreases as the discrete angle $\theta_n'$ of the periodic structure increases.

Thus, the mixed periodic structure 11S3 satisfying the formulae (11) to (13) has a plurality of values for the period d of the periodic structure. Therefore, counterfeiting of the mixed periodic structure 11S3 or counterfeiting of the color display 20 having the mixed periodic structure 11S3 is more difficult compared with the mixed periodic structure 11S3 having a single value for the period d of the periodic structure.

Further, when the mixed periodic structure 11S3 is configured with a blazed diffraction grating structure, the diffracted light is directed in the positive or negative direction, which can be selectively used depending on the motif desired to express by the color display 20. Although a general diffraction grating reflects light only at a diffraction angle satisfying formula (10), the mixed periodic structure 11S3 satisfying formulae (11) to (13) can control the reflection angle using the relationship between the plurality of periods and the density. Further, in addition to the diffraction grating, a scattering structure having directivity is typically used as a structure for controlling the reflection angle. However, such a structure can control the orientation direction of reflection but cannot control the elevation direction. Therefore, it is not possible to achieve an optical effect as with the mixed periodic structure 11S3 satisfying formulae (11) to (13).

Figure 20:
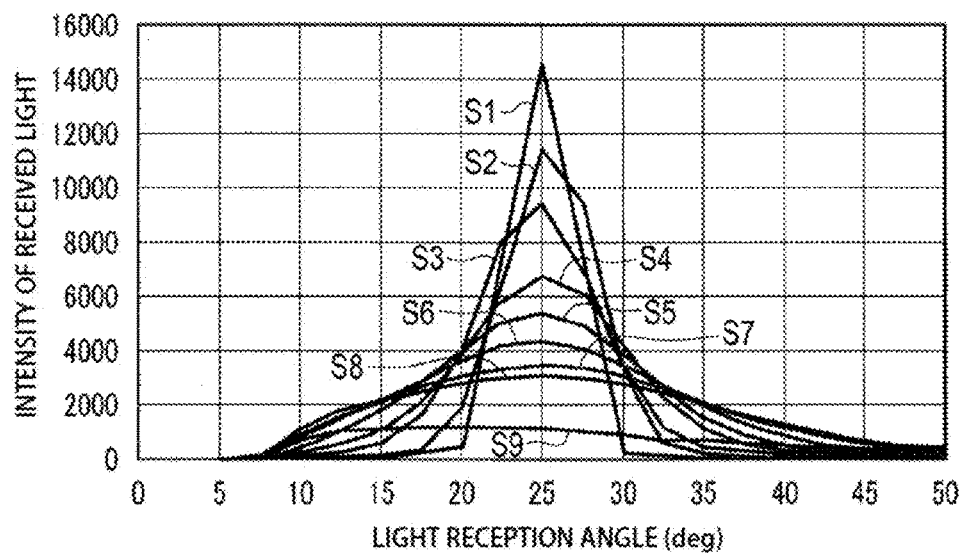
FIG. 20 is a diagram showing spectra of light reflected from nine color displays having different r values.

FIG. 20 is a diagram showing spectra of reflected light in nine color displays having different r values, in which the horizontal axis represents the light reception angle and the vertical axis represents the intensity of received light.

FIG. 20 shows spectra S1 to S9 obtained with the color display 20 having the mixed periodic structure 11S3, on which light having a wavelength of 540 nm incident at 0°, that is, from directly above, is diffracted in first order at 25°. Further, the r value is set to any one of 255, 238, 221, 204, 187, 170, 153, 136 and 119.

As shown in FIG. 20, the spectra S1, S2 and S3 are obtained when the r value is set to 255, 238 and 221, respectively. Further, the spectra S4, S5 and S6 are obtained when the r value is set to 204, 187 and 170, respectively. Further, the spectra S7, S8 and S9 are obtained when the r value is set to 153, 136 and 119, respectively.

As seen from spectra S1 to S9, the smaller the r value, the wider the angular reception range of light reflected from the color display 20, in other words, the first-order diffraction angle. On the other hand, the larger the r value, the higher the intensity of the light received at 25°, that is, the intensity of the first-order diffracted light reflected at 25°.

Figure 21:
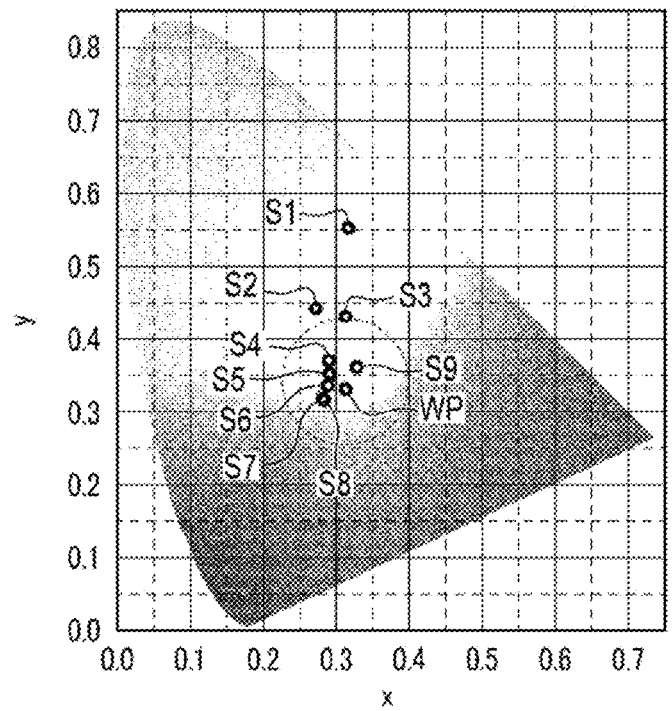
FIG. 21 is a diagram showing colors of light reflected from nine color displays in the xy chromaticity diagram.

FIG. 21 is a diagram showing colors of light reflected from nine color displays in the xy chromaticity diagram.

As shown in FIG. 21, the reflected light having the spectrum S1 and the reflected light having the spectrum S2 are green. On the other hand, the reflected light having any of the spectra S3 to S9 is white. Therefore, the r value in the above formula (8) can be 221 or less. Further, the r value can be in the range of 204 or more and 221 or less. As a result, the intensity of reflected light can be prevented from decreasing.

In FIG. 21, the area surrounded by the dotted line is a white area indicating a white point WP (x=0.33, y=0.33).

The mixed periodic structure 11S3 of the present embodiment is configured to display an achromatic second motif by satisfying the above formulae (11) to (13). Accordingly, the motif formed of the region A is a chromatic image and the motif formed of the region B is an achromatic image, whereby the motif changes depending on the observation angle and becomes more conspicuous.

The chromatic image is an image using chromatic colors. The chromatic image can be an image using a difference in hue. The chromatic image can include two regions having a color difference $\Delta E^*ab=\sqrt{(\Delta a^*)^2+(\Delta b^*)^2}$ of 5 or more at $a^*b^*$ other than the brightness $L^*$ among the color values $L^*a^*b^*$ according to CIE 1976. In this case, the color value $L^*a^*b^*$ can be a color value $L^*a^*b^*$ in a range of 3 mm diameter.

The achromatic image is an image using achromatic colors or light colors. The achromatic image can be a grayscale image having a grayscale gradation. The achromatic image can be colorless or monochromatic. In a chromatic image, the higher the saturation of the image, the higher the change in color even when color difference between two regions is the same. Accordingly, the chromatic image can have an appearance with intricate pattern. Further, the higher the saturation of the image, the better external aesthetic appearance the chromatic image has.

In the mixed periodic structure 11S3 in the region B, the periodic direction which is the arrangement direction of the periods may be set to be the same, and a plurality of regions B may have different periodic directions. The achromatic light described above is recognized by the observer as light having different intensities depending on the periodic direction, and the motif formed of the region B having a plurality of directions can be formed as a grayscale image having gradation.

Figure 22A:
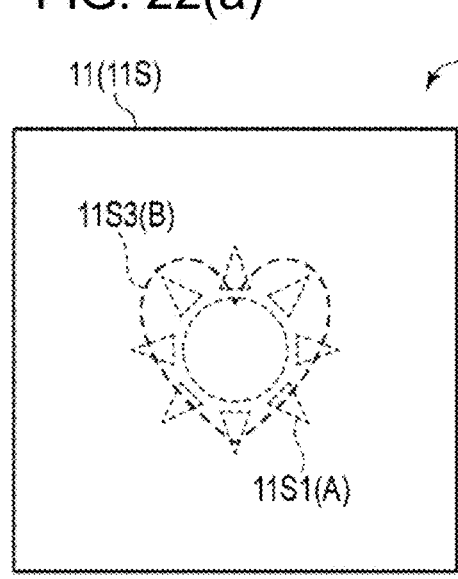
FIGS. 22(a) and 22(b) are plan views of a structure of a color display.
Figure 22B:
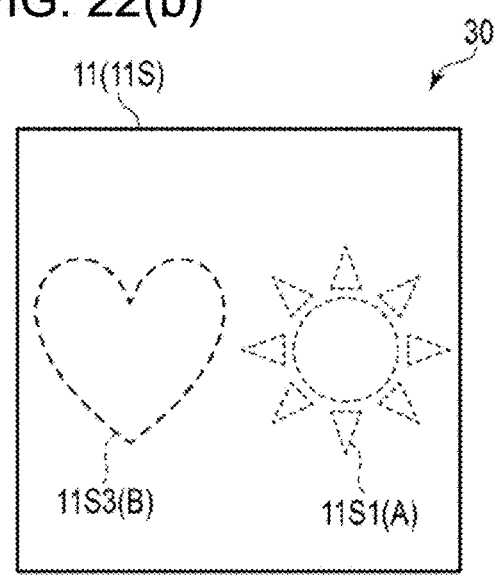

FIGS. 22(a) and 22(b) are plan views of a structure of a color display.

With reference to FIGS. 22(a) and 22(b), the relationship between the region A and the region B will be described. In a color display 30 shown in FIG. 22(a), the region A is disposed at a position including a center part of the surface 11S when viewed in a direction perpendicular to a plane in which the color display 30 extends. Further, similarly to the region A, the region B is disposed at a position including a center part of the surface 11S. In the present embodiment, the outer shape formed of the region A has a shape of the sun, and the outer shape of the region B has a shape of a heart. It should be noted that the outer shape of the region A and the outer shape of the region B can be other shapes. The region defined by the region A overlaps with the region defined by the region B when viewed in a direction perpendicular to a plane in which the color display 30 extends. However, the region A and the region B do not overlap with each other when viewed in a direction perpendicular to a plane in which the color display 30 extends.

As shown in FIG. 22(b), there is a case where the region A does not overlap with the region B when viewed in a direction perpendicular to a plane in which the color display 30 extends.

Figure 23:
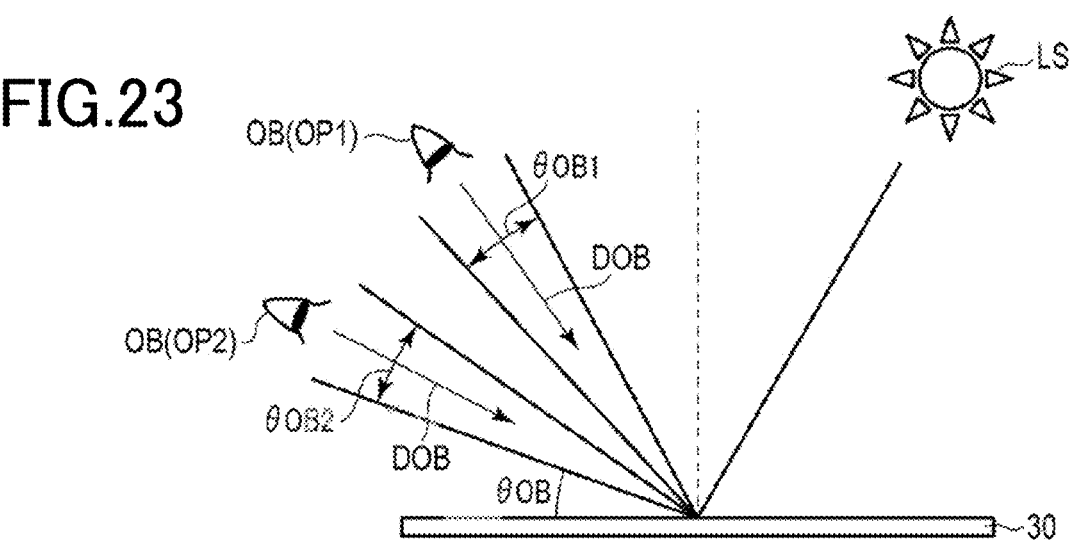
FIG. 23 is a schematic diagram illustrating a relationship between a first range and a second range of the observation angle.

FIG. 23 is a schematic diagram illustrating a relationship between a first range and a second range of the observation angle.

As shown in FIG. 23, an angle formed between the plane in which the color display 30 is located and the plane in which the viewing direction DOB of the observer OB observing the color display 30 is included is an observation angle θOB. The region A displays a first motif observed at a range θOB1 of the observation angle θOB. The region B displays a second motif observed at a range θOB2 of the observation angle θOB.

The range θOB1 includes an observation angular range other than the observation angle θOB included in the range θOB2, and the range θOB2 includes an observation angular range other than the observation angle θOB included in the range θOB1.

Accordingly, the observation angle θOB of the color display 30 includes the observation angle θOB at which only the first motif is displayed and the observation angle θOB at which only the second motif is displayed. Therefore, the observer OB can observe each image at a specific observation angle θOB without being disturbed by other images.

In the present embodiment, the range θOB2 is different from the range θOB1 in the observation angle θOB. Further, the color display 30 does not display the first motif or the second motif at a range θOB3 (not shown) of the observation angle θOB. The range θOB3 includes an observation angle θOB between the range θOB1 and the range θOB2.

Since the region A reflects light from the light source LS in a direction of specular reflection, the range θOB1 includes the direction of specular reflection. The observation angle BOB at which the region B reflects light is determined by the period d of the periodic structure of the mixed periodic structure 11S3 and the direction in which the periods are arranged.

In the present embodiment, the range θOB2 is a range different from the range θOB1. However, the range θOB2 may include part of the range θOB1 and a range different from the range θOB1. Further, when the range θOB3 (not shown) is set for the observation angle θOB, the range θOB3 can include, in addition to the observation angle θOB between the range θOB1 and the range θOB2, the range described below. That is, the range θOB3 may include a range which is between the plane in which the color display 30 extends and the range θOB2 and does not include the range θOB1. Alternatively, the range θOB3 may include a range which is between the plane in which the color display 30 extends and the range θOB1 and does not include the range θOB2.

(Effect of Color Display)

Effects of the color display 30 will be described with reference to FIGS. 24 to 26. In the following description, the effects of the color display 30 applied to an authentication medium will be described.

Figure 24:
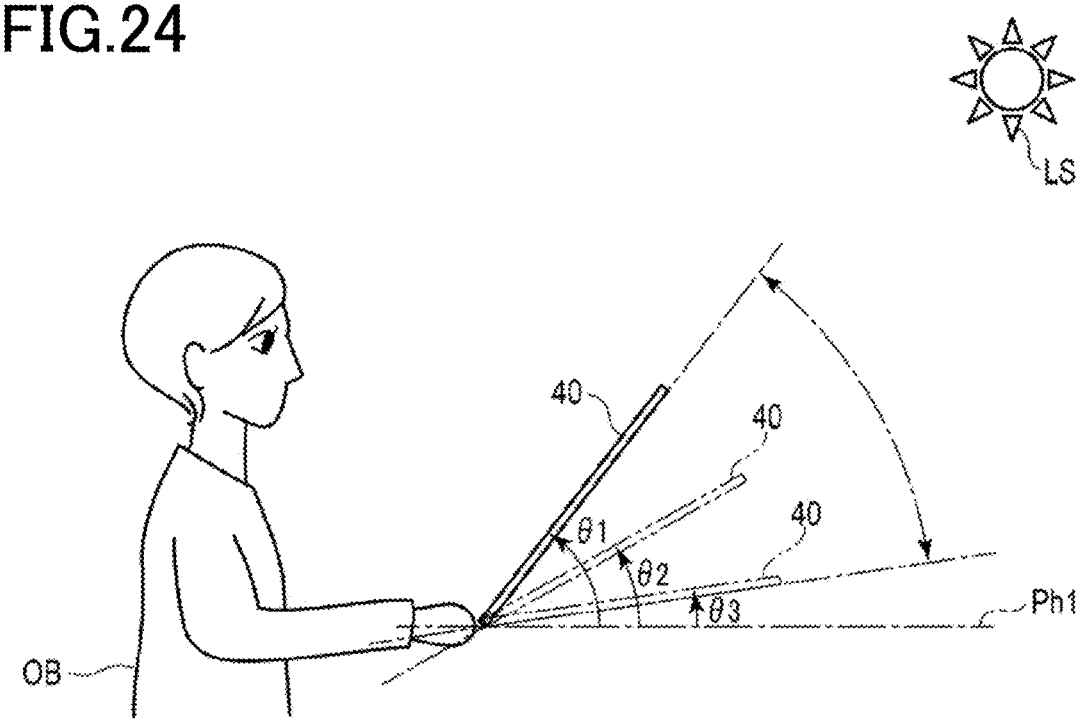
FIG. 24 is a schematic diagram illustrating a state in which an observer observes a color display.

FIG. 24 is a schematic diagram illustrating a state in which an observer observes a color display.

As shown in FIG. 24, the observer OB of the authentication medium 40 can observe the authentication medium 40 while holding the authentication medium 40 in his or her hand. In the example shown in FIG. 24, the observer OB observes the authentication medium 40 in a state in which the authentication medium 40 is tilted by an angle θ1 relative to a reference surface Ph1 parallel to the horizontal direction. Alternatively, the observer OB observes the authentication medium 40 in a state in which the authentication medium 40 is tilted by an angle θ2 relative to the reference surface Ph1. Alternatively, the observer OB observes the authentication medium 40 in a state in which the authentication medium 40 is tilted by an angle θ3 relative to the reference surface Ph1. The angle θ1 is larger than the angle θ2, and the angle θ2 is larger than the angle θ3.

Figure 25A:
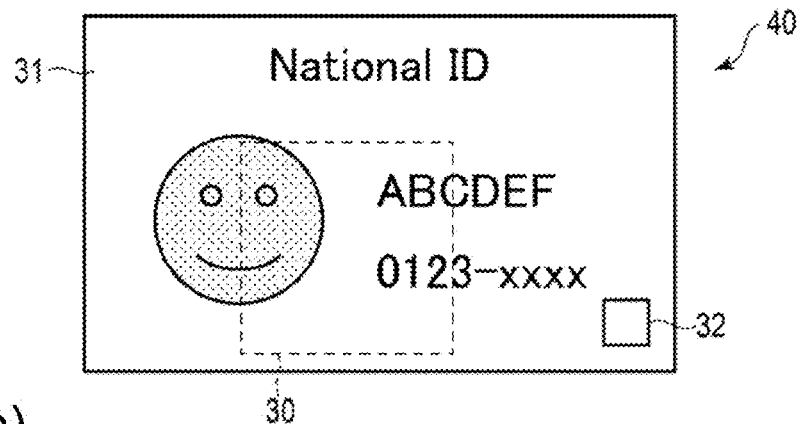
FIGS. 25(a)-25(c) are plan views of an image displayed by an authentication medium including a color display.
Figure 25B:
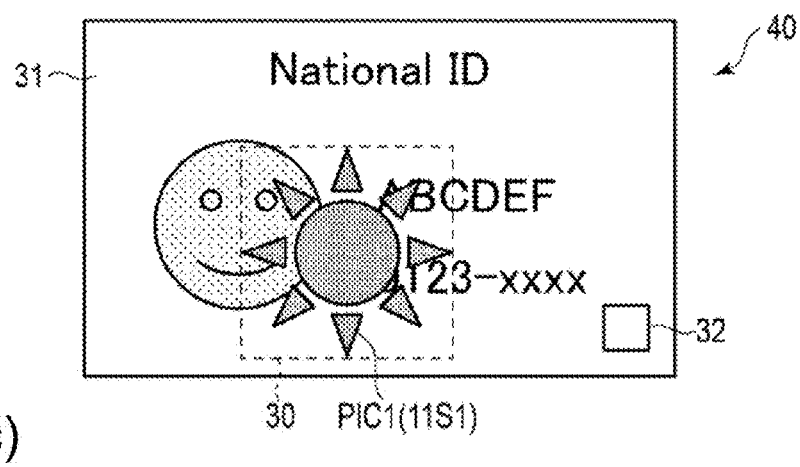
Figure 25C:
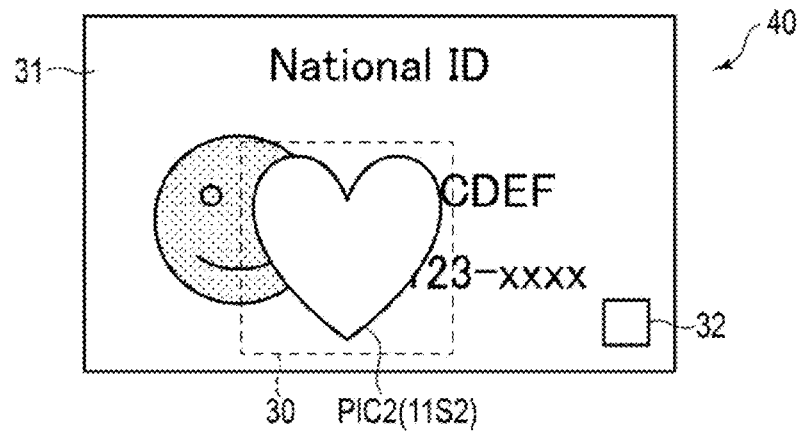

FIGS. 25(a)-25(c) are plan views of an image displayed by an authentication medium including a color display.

FIGS. 25(a)-25(c) show a state of the authentication medium 40 perceived by the observer OB depending on the tilt of the authentication medium 40.

In the example shown in FIG. 25(a), the authentication medium 40 includes the color display 30 and a support 31 that supports the color display 30. In the present embodiment, the authentication medium 40 further includes an information recording medium 32 supported by the support 31. The support 31 may be, for example, a sheet made of synthetic resin. The support 31 can store various types of information. The various types of information may be, for example, the type of authentication medium 40, the biometric information, the non-biometric information or both thereof of the owner of the authentication medium 40. Examples of the biometric information include the facial image of the owner, the autograph of the owner, and the fingerprint of the owner. Examples of the non-biometric information include the name of the owner, the nationality of the owner, the date of birth of the owner, a nationality code of the owner, and an owner code. The information recording medium 32 may be, for example, an IC chip. Further, the authentication medium 40 may not necessarily include the information recording medium 32.

The authentication medium 40 has a state in which the region A does not display the first motif and the region B does not display the second motif to an observation position OP of the observer OB. As described above, in the present embodiment, when the observation angle θOB is the range θOB3 (not shown), the authentication medium 40 does not display the first motif or the second motif. That is, when the observer OB tilts the authentication medium 40 at the angle θ2, the authentication medium 40 does not display the first motif or the second motif.

When the authentication medium 40 does not display the first motif or the second motif, the information recorded on the support 31 can be easily seen by the observer OB. Thus, when the color display 30 is observed by the observer OB in the range θOB3 (not shown) of the observation angle θOB, the observer can easily recognize the state of the color display 30 other than the first motif and the second motif displayed by the color display 30.

On the other hand, in the example shown in FIG. 25(b), the authentication medium 40 has a state in which the region A displays a first motif PIC1 (hereinafter, simply referred to as a "motif PIC1") and the region B does not display the second motif to the observation position OP of the observer OB. As described above, in the present embodiment, when the observation angle θOB is the range θOB1, the authentication medium 40 displays the motif PIC1 but does not display the second motif. That is, when the observer OB tilts the authentication medium 40 at the angle θ1, the authentication medium 40 displays the motif PIC1 but does not display the second motif.

Further, in the example shown in FIG. 25(c), the authentication medium 40 has a state in which the region A does not display the motif PIC1 and the region B displays a second motif PIC2 (hereinafter, simply referred to as a "motif PIC2") to the observation position OP of the observer OB. As described above, in the present embodiment, when the observation angle θOB is in the range θOB2, the authentication medium 40 does not display the motif PIC1 but displays the motif PIC2. That is, when the observer OB tilts the authentication medium 40 at the angle θ3, the authentication medium 40 does not display the motif PIC1 but displays the motif PIC2.

Figure 26A:
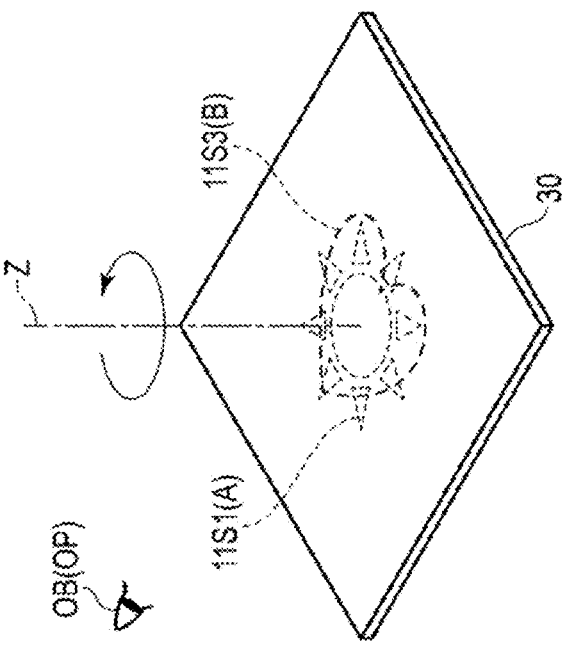
FIGS. 26(a) and 26(b) are diagrams illustrating a first position and a second position of a color display.
Figure 26B:
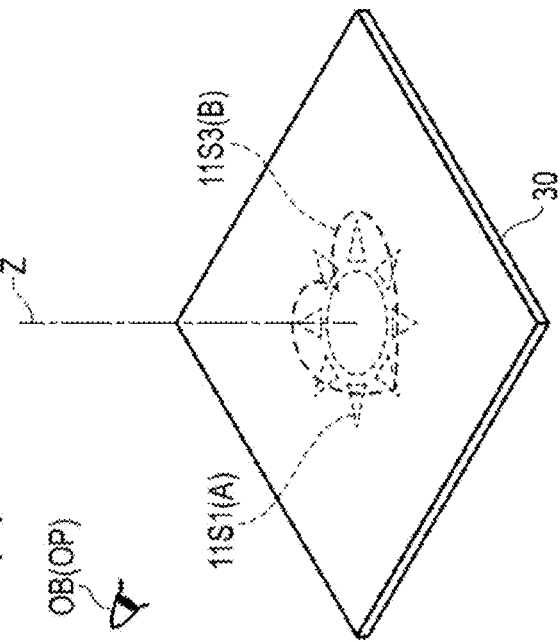

FIGS. 26(a) and 26(b) are diagrams illustrating a first position and a second position of a color display.

FIGS. 26(a) and (b) show that the color display 30 is rotated about a rotation axis Z in a state in which the observation position OP of the observer OB and a position of a light source (not shown) are fixed.

As shown in FIG. 26(a), the line normal to a plane in which the color display 30 extends is the rotation axis Z. The color display 30 may be disposed, for example, at an arbitrary position on a plane parallel to a horizontal surface. This arbitrary position is the first position of the color display 30.

As shown in FIG. 26(b), the color display 30 has the second position different from the first position. The second position is a position shifted from the first position by rotating the color display 30 by 90° about the rotation axis Z. In the present embodiment, the second position is a position where the color display 30 has been rotated counterclockwise by 90° from the first position. However, the second position may be a position where the color display 30 has been rotated clockwise by 90°.

When the color display 30 is oriented in the first position, the region A displays the motif PIC1 having a first color to the observation position OP. For example, the motif PIC1 described above with reference to FIG. 25(b) is the motif PIC1 having the first color. The first color is a color which is a chromatic color.

On the other hand, as shown in FIG. 26(b), when the color display 30 is oriented in the second position, the region A displays the motif PIC1 having a second color to the observation position OP. The second color is different from the first color. The second color is also a color which is a chromatic color as with the first color. By rotating the color display 30, an apparent effective refractive index $n_{eff}$ for the light incident on the color display 30 becomes a value different from that before the color display 30 is rotated. Therefore, when the observer OB observes the motif PIC1, the color of the motif PIC1 in the color display 30 oriented in the first position and the color of the motif PIC1 in the color display 30 oriented in the second position are different from each other.

When the color display 30 is oriented in the first position, the region B displays the motif PIC2 having a first luminance to the observation position OP. For example, the motif PIC2 described above with reference to FIG. 25(c) is the motif PIC2 having the first luminance. The first luminance is a luminance at which the observer OB can recognize that the color display 30 displays the motif PIC2.

On the other hand, as shown in FIG. 26(b), when the color display 30 is oriented in the second position, the region B displays the motif PIC2 having a second luminance to the observation position OP. The second luminance is different from the first luminance. In the present example, the observer OB can recognize that the color display 30 displays the motif PIC2 at the second luminance. The second luminance is lower than the first luminance. Alternatively, the second luminance can be set to be higher than the first luminance.

By rotating the color display 30, the arrangement direction of the periods of the mixed periodic structure 11S3 formed of the region B as viewed from the observer OB changes from that before the color display 30 is rotated. Accordingly, the ratio of the light that can be observed by the observer OB to the light reflected from the region B changes. Therefore, when the observer OB observes the motif PIC2, the luminance of the motif PIC2 in the color display 30 oriented in the first position and the luminance of the motif PIC2 in the color display 30 oriented in the second position are different from each other.

Thus, the color display 30 can have two states that gives different impressions of the motif PIC1 to the observer OB, and also have two states that give different impressions of the motif PIC2 to the observer OB.

As described above, since the appearance of the motif can be changed depending on the observation angle and rotation angle, the authentication medium 40 can be easily used by the observer to determine authenticity.

As described above, according to the second embodiment of the color display, authentication medium, and method for determining authenticity of the color display, the following effects are achieved.

(6) Since the surface 11S of the embossed layer 11 includes the periodic structure 11S1 formed of the region A and the mixed periodic structure 11S3 formed of the region B, counterfeiting of the color display having the embossed layer 11 becomes difficult compared with the case where the surface 11S of the embossed layer 11 includes only the periodic structure 11S1.

(7) Compared with the case where both the motif PIC1 and the motif PIC2 are chromatic images or the case where both the motif PIC1 and the motif PIC2 are achromatic images, the color display 30 is more conspicuous.

(8) The observation angle θOB of the color display 30 includes the observation angle θOB at which only the motif PIC1 is displayed and the observation angle θOB at which only the motif PIC2 is displayed. Therefore, the observer OB can observe each image at a specific observation angle θOB without being disturbed by other images.

(9) When the color display 30 is observed by the observer OB in the range θOB3 of the observation angle θOB, the observer can easily recognize the state of the color display 30 other than the motif PIC1 and the motif PIC2 displayed by the color display 30.

(10) The color display 30 can have two states that give different impressions of the motif PIC1 to the observer OB, and also have two states that give different impressions of the motif PIC2 to the observer OB.

Modifications of Second Embodiment

The above second embodiment can be modified and implemented as follows.

(Mixed Periodic Structure 11S3)

The mixed periodic structure 11S3 can display the motif PIC2 having the same luminance when it is oriented in the first position and the second position. In this case as well, when the periodic structure 11S1 displays a chromatic image and the mixed periodic structure 11S3 displays an achromatic image, a similar effect to that described above can be obtained.

(Observation Angle)

The first range of the periodic structure 11S1 and the second range of the mixed periodic structure 11S3 can be the same range. That is, the minimum value of the first range can be equal to the minimum value of the second range, and the maximum value of the first range can be equal to the maximum value of the second range. In this case as well, when the periodic structure 11S1 displays a chromatic image and the mixed periodic structure 11S3 displays an achromatic image, a similar effect to that described above can be obtained.

Application Examples of First and Second Embodiments

Application examples of the above-mentioned first embodiment and second embodiment will be described. Although the above description has focused on visual effects, the following description will be given not only of the visual effects but also of machine reading applications and methods for determining authenticity. While the color display can be used by the observer to determine authenticity by using a visual effect, it can also be used to determine authenticity by reading it with a machine at high resolution to read complicated information that cannot be read by the observer or fine information that cannot be resolved by the observer's eye.

Since the display surface of the color display 30 includes a color image of the first motif formed of the region A and a grayscale image of the second motif formed of the region B, either or both of the color image and the grayscale image can be stored as an authentication code, and can be used as a machine-readable authentication code for authenticity determination.

Further, since the observation angles at which the motif PIC1 and the motif PIC2 are observed can be controlled, the motif information obtained at the observation angles can be recorded as authentication codes. Such authentication codes are machine-readable, and can be used for authenticity verification.

Moreover, according to the effects of the guided-mode resonance described referring to formulae (1) to (6), the wavelength at which resonance occurs changes depending on the height difference which is a difference in height between adjacent pairs of the convexities and the concavities on the concavo-convex surface 11S1 having a periodic structure, the dimension ratio between the convexities and the concavities, and the period. Accordingly, when a sub-region A1 in which at least one of these is changed is included in the region A, the sub-region A1 can be recorded as an authentication code. Such authentication codes are machine-readable, and can be used for authenticity verification.

In addition, as in the color display 30 described referring to FIGS. 26(a) and 26(b), the region A can change the visible color depending on the observation position. For example, assuming that a region A exhibits blue at the first position and red at the second position, the region A may include at least in part a sub-region A2 that exhibits red at the first position and blue at the second position. In this case, the colors of the region A and the sub-region A2 are mixed to display the same color (purple) at both the first position and the second position. Accordingly, a region that does not change in color at the first position and the second position can be recorded as an authentication code. Such an authentication code is machine-readable, and can be used for authenticity verification.

Further, the region B, which includes the mixed periodic structure 11S3 having a plurality of periods, may include a sub-region B1 locally configured with a single period. In this case, since the achromatic region B can locally include a chromatic color, the colored sub-region composed of the sub-region B1 can be recorded as an authentication code. Such an authentication code is machine-readable, and can be used for authenticity verification.

Further, the region B may include a sub-region B2 having a relationship of a plurality of periods locally different from that of the mixed periodic structure 11S3 of the region B. In this case, the reflection angle or the achromatic color information can be locally changed. Accordingly, the sub-region B2 can be recorded as a machine-readable authentication code and can be used for authenticity determination.

Further, the region B may include a sub-region B3 having an arrangement direction of convexities and concavities locally different from that of the mixed periodic structure 11S3 of the region B. In this case, the achromatic grayscale information can be locally changed. Accordingly, the sub-region B3 having different grayscale information formed of the sub-region B3 can be recorded as a machine-readable authentication code. Such an authentication code is machine-readable, and can be used for authenticity verification.

In addition, when the region A and the region B include a different region C, the effect different from the optical effect of each of the region A and the region B can be recorded as an authentication code. Such an authentication code is machine-readable, and can be used for authenticity verification. The region C can be a region 11S2 or can also be a newly provided region.

A method of authenticity verification can use the result of machine-reading of the recorded authentication code. The verification can be performed by the machine, or can be determined by a computer connected to the machine based on the result of machine-reading transmitted from the machine. Alternatively, a computer may be connected to the machine and a verification server so that the computer transmits, to the server, the result of machine-reading transmitted from the machine, and the server transmits the result of verification to the computer.

(Authentication Code)

The machine-readable authentication code is not particularly limited, and, in addition to the above motif images, may also include characters, numbers, symbols, and a combination thereof. Alternatively, a one-dimensional barcode, a two-dimensional barcode, or the like can be used.

The present invention is not limited to the embodiments described above, but may be modified in various ways when implemented, without departing from the spirit of the present invention. The embodiments may be appropriately combined and implemented. In this case, the combinations each exert the advantageous effects accordingly. Further, the embodiments described above include inventions of various stages. Therefore, a plurality of disclosed elements may be appropriately combined so that various inventions can be obtained.

What is claimed is:

1. A color display, comprising:
   an embossed layer;
   a high refractive index layer; and
   a protective layer, laminated in this order, wherein
   the high refractive index layer has a highest refractive index among these layers,
   the embossed layer includes a first region (A) having a periodic structure with a period at least smaller than a center wavelength of visible light,
   a plurality of the first regions (A), each having a strip shape, are connected to each other at their longitudinal end sides, the first regions (A) being offset from each other in a direction perpendicular to a longitudinal direction of the strip shape, as viewed via a display surface, and
   a periodic direction of the periodic structure is parallel to the longitudinal direction, wherein
   the embossed layer includes the first region (A) having a strip shape configured with a first periodic structure and a second region (B) configured with a second periodic structure including a plurality of different periods, a plurality of the first regions (A) and a plurality of the second regions (B) being alternately arranged at least in the longitudinal direction or the direction perpendicular to the longitudinal direction, and the second region (B) has a dimension smaller than that of the first region (A),
   a color image is formed at the observation angle at which the zeroth-order diffracted light emitted from the first region (A) is observed, and a grayscale image is formed at the observation angle at which the first-order diffracted light emitted from the second region (B) is observed,
   a position of a viewpoint for observing the color image formed of the first region (A) is an observation position,
   the color display has a first position and a second position relative to a rotation axis normal to a plane in which the color display extends,
   the second position is a position shifted from the first position by rotating the color display by 90° about the rotation axis,
   the color display, when oriented in the first position, displays a first color image (1) having a first color to the observation position,
   the color display, when oriented in the second position, displays a second color image (2) having a second color to the observation position,
   the first region (A) includes a second sub-region (A2) which locally includes a plurality of periods, the second sub-region (A2) is formed as an authentication code having a same color in both the first position and the second position, and the authentication code is used as a machine-readable authentication code for determining authenticity.

2. The color display of claim 1, wherein zeroth-order diffracted light is emitted from the first region (A) due to resonance occurring by a periodic configuration of the high refractive index layer laminated on the periodic structure.

3. The color display of claim 1, wherein the periodic structure included in the first region (A) includes a plurality of periods selectively used, and a longitudinal dimension of the first region (A) is an integer multiple of a value obtained by using a least common multiple of the plurality of periods selectively used as a dividend and a greatest common divisor of the plurality of periods selectively used as a divisor.

4. The color display of claim 1, wherein first-order diffracted light is emitted from the second region (B) due to interference occurring by a mixed periodic configuration of the high refractive index layer laminated on the second periodic structure.

5. The color display of claim 4, wherein an angle formed between the display surface and a plane in which a viewing direction of an observer observing the color display is included is an observation angle, and the observation angle at which the zeroth-order diffracted light emitted from the first region (A) is observed and the observation angle at which the first-order diffracted light emitted from the second region (B) is observed are different from each other.

6. The color display of claim 1, wherein an image formed of at least one of the first region (A) and the second region (B) is used as a machine-readable authentication code for determining authenticity.

7. The color display of claim 1, wherein the first periodic structure includes convexities and concavities, the convexities and concavities have a height difference between adjacent pairs of the convexities and concavities, the first region (A) includes a first sub-region (A1) in which at least one of the height difference, a dimension ratio between the convexities and the concavities, and a period is locally different, and an authentication code formed of the first sub-region (A1) is used as a machine-readable authentication code for determining authenticity.

8. The color display of claim 1, wherein the second region (B), which includes a plurality of periods in the second periodic structure, includes a third sub-region (B1) locally configured with a single period, and an authentication code formed of the third sub-region (B1) is used as a machine-readable authentication code for determining authenticity.

9. The color display of claim 1, wherein the second region (B) includes a fourth sub-region (B2) having a relationship of a plurality of periods locally different from that of the second periodic structure, and an authentication code formed of the fourth sub-region (B2) is used as a machine-readable authentication code for determining authenticity.

10. The color display of claim 1, wherein the second region (B) includes a fifth sub-region (B3) having an arrangement direction of convexities and concavities locally different from that of the second periodic structure, and an authentication code formed of the fifth sub-region (B3) is used as a machine-readable authentication code for determining authenticity.

11. The color display of claim 1, wherein an authentication code formed of a third region (C) different from each of the first region (A) and the second region (B) is used as a machine-readable authentication code for determining authenticity.

12. An authentication medium comprising the color display of claim 1.

13. A method for determining authenticity of the color display of claim 1, comprising the steps of:

using an image formed of at least one of the first region (A) and the second region (B) as an authentication code;

performing machine-reading of the authentication code; and determining authenticity of the color display based on a result of the machine-reading.

* * * * *